United States Patent
Lee et al.

(10) Patent No.: US 11,032,680 B2
(45) Date of Patent: Jun. 8, 2021

(54) METHOD AND APPARATUS FOR SUPPORTING VEHICLE COMMUNICATIONS IN 5G SYSTEM

(71) Applicant: Samsung Electronics Co., Ltd., Suwon-si (KR)

(72) Inventors: Hoyeon Lee, Suwon-si (KR); Sunghoon Kim, Suwon-si (KR); Youngkyo Baek, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/377,043

(22) Filed: Apr. 5, 2019

(65) Prior Publication Data

US 2019/0313221 A1 Oct. 10, 2019

(30) Foreign Application Priority Data

Apr. 5, 2018 (KR) .................. 10-2018-0039902
May 21, 2018 (KR) .................. 10-2018-0057774
Jun. 26, 2018 (KR) .................. 10-2018-0073423

(51) Int. Cl.
| | |
|---|---|
| *H04W 4/40* | (2018.01) |
| *H04W 60/00* | (2009.01) |
| *H04W 4/70* | (2018.01) |
| *H04W 4/42* | (2018.01) |
| *H04W 76/15* | (2018.01) |

(Continued)

(52) U.S. Cl.
CPC ............ *H04W 4/40* (2018.02); *H04L 41/0893* (2013.01); *H04W 4/42* (2018.02); *H04W 4/70* (2018.02); *H04W 60/005* (2013.01); *H04W 60/04* (2013.01); *H04W 76/15* (2018.02); *H04W 88/06* (2013.01)

(58) Field of Classification Search
CPC ..... H04W 60/005; H04W 88/06; H04W 4/40; H04W 4/70; H04W 76/15
See application file for complete search history.

(56) References Cited

U.S. PATENT DOCUMENTS

| | | |
|---|---|---|
| 2019/0037448 A1 | 1/2019 | Shan et al. |
| 2019/0150082 A1 | 5/2019 | Kedalagudde et al. |
| 2019/0230645 A1 | 7/2019 | Cheng et al. |

FOREIGN PATENT DOCUMENTS

| | | |
|---|---|---|
| KR | 10-2018-0039512 A | 4/2018 |
| WO | 2017189035 A1 | 11/2017 |

OTHER PUBLICATIONS

ISA/KR, International Search Report and Written Opinion of the International Searching Authority, International Application No. PCT/KR2019/004055, dated Jul. 22, 2019, 8 pages.

(Continued)

*Primary Examiner* — Sam Bhattacharya

(57) ABSTRACT

The disclosure relates to a communication method and system that combine the 5G communication system and the IoT technology to support a higher data rate after the 4G system. Based on the 5G communication technology and IoT technology, the disclosure can be applied to various intelligent services (e.g., smart home, smart building, smart city, smart or connected car, healthcare, digital education, retail business, and security and safety service). The disclosure relates to a method and apparatus for terminating a cellular network connection to a terminal without authentication. The disclosure relates to a method and system for providing a vehicle communication service in the 3GPP system.

20 Claims, 21 Drawing Sheets

(51) Int. Cl.
    H04L 12/24      (2006.01)
    H04W 60/04      (2009.01)
    H04W 88/06      (2009.01)

(56)　　　　　References Cited

OTHER PUBLICATIONS

3GPP TS 23.285 V15.0.0 (Mar. 2018), Technical Specification, 3rd Generation Partnership Project; Technical Specification Group Services and System Aspects; Architecture enhancements for V2X services (Release 15), Mar. 2018, 36 pages.
Huawei, et al., "Clarification on Key Issue #7: Network Slicing for eV2X Services and initial solution," S2-181949 (was S2-18xxxx), SA WG2 Temporary Document, SA WG2 Meeting #126, Montreal, Canada, Feb. 26-Mar. 2, 2018, 3 pages.
Huawei, et al., "Solution to Key Issue #5: Service Provisioning to UE for eV2X communications," S2-182252 (revision of S2-18xxxx), SA WG2 Temporary Document, SA WG2 Meeting #126, Montreal, Canada, Feb. 26-Mar. 2, 2018, 7 pages.
ZTE, "5GS eV2X architecture discussion and proposal," S2-182168 (revision of S2-18xxxx), SA WG2 Temporary Document, SA WG2 Meeting #126, Montreal, Canada, Feb. 26-Mar. 2, 2018, 3 pages.
USPTO Office Action regarding U.S. Appl. No. 16/377,061, dated Oct. 3, 2019, 13 pages.

FIG. 7

| Slice/Service type | SST value | Characteristics |
|---|---|---|
| V2X | 101 | Slice suitable for the handling of V2X services |
| V2N | 102 | Slice suitable for the handling of V2N services |
| V2I | 103 | Slice suitable for the handling of V2I services |
| V2V | 104 | Slice suitable for the handling of V2V services |
| V2P | 105 | Slice suitable for the handling of V2P services |

| S-NSSAI indicating V2X slice | SST value | SD value |
|---|---|---|
| S-NSSAI for V2X | 101 | (optional) |
| S-NSSAI for V2N | 102 | (optional) |
| S-NSSAI for V2I | 103 | (optional) |
| S-NSSAI for V2V | 104 | (optional) |
| S-NSSAI for V2P | 105 | (optional) |

FIG. 9

| Service type | V2X service ID (e.g. PSID or ITS-AID) | RAT type |
|---|---|---|
| Basic Safety Message service | 0 | LTE |
| Event Notification Message service | 1 | NR |
| Extended Sensors service | 2 | LTE, NR |
| Platooning service | 3 | NR |
| Remote Driving service | 4 | Uu |

FIG. 15

| Service type | V2X service ID (e.g. PSID or ITS-AID) | Frequency |
|---|---|---|
| Basic Safety Message service | 0 | 1~100 MHz |
| Event Notification Message service | 1 | 100~200 MHz |
| Extended Sensors service | 2 | 5.9 GHz |
| Platooning service | 3 | 5.9 GHz |
| Remote Driving service | 4 | Uu |

METHOD AND APPARATUS FOR SUPPORTING VEHICLE COMMUNICATIONS IN 5G SYSTEM

CROSS-REFERENCE TO RELATED APPLICATIONS

CROSS-REFERENCE TO RELATED APPLICATIONS

This application is based on and claims priority under 35 U.S.C. 119(a) to Korean Patent Application No. 10-2018-0039902 filed on Apr. 5, 2018, Korean Patent Application No. 10-2018-0057774 filed on May 21, 2018, and Korean Patent Application No. 10-2018-0073423 filed on Jun. 26, 2018 in the Korean Intellectual Property Office, the disclosures of which are herein incorporated by reference in their entirety. The present application is related to U.S. application Ser. No. 14/255,881 filed Apr. 5, 2019 and entitled "METHOD AND APPARATUS FOR SUPPORTING VEHICLE COMMUNICATIONS IN 5G SYSTEM," the disclosure of which is incorporated by reference herein in its entirety.

BACKGROUND

1. Field

The disclosure relates to a method for providing a vehicle communication (vehicle-to-everything, V2X) service in a 5G mobile communication system.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

The 5G system aims to support a wider variety of services than the existing 4G system. For example, the representative services may include enhanced mobile broadband (eMBB), ultra-reliable and low-latency communication (URLLC), massive machine type communication (mMTC), and evolved multimedia broadcast/multicast service (eMBMS). The system providing the URLLC service may be referred to as a URLLC system, the system providing the eMBB service may be referred to as an eMBB system, or the like. The terms "service" and "system" may be used interchangeably.

Among them, the URLLC service is a newly considered service in the 5G system and, unlike the existing 4G system, requires satisfaction of extremely high reliability (e.g., packet error rate of about $10^{-5}$) and low latency (e.g., about 0.5 msec) compared with other services. To satisfy such strict requirements, it may be necessary to apply a shorter transmission time interval (TTI) to the URLLC service in comparison to the eMBB service. Various techniques utilizing short TTIs are being considered.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

V2X (vehicle-to-everything) is a general term indicating all types of communication techniques applicable to road vehicles, and is being applied to various supplementary services in addition to the initial safety use case along with the development of wireless communication technology.

As a V2X service providing technology, WAVE (wireless access in vehicular environments) specifications have been standardized based on IEEE 802.11p and IEEE P1609. However, WAVE as a dedicated short range communication (DSRC) technology has a limitation in the message transmission range between vehicles.

To overcome such a limitation, the cellular-based V2X technology standard is underway in 3GPP. The LTE-based 4G V2X standard has been completed in Release 14, and the NR-based 5G V2X standard is underway in Release 16.

SUMMARY

Accordingly, the disclosure defines a 5G-based V2X system architecture. The disclosure also defines a V2X network slice structure for providing V2X services. In addition, the disclosure defines a method for providing provisioning information to a terminal for a V2X service in the 5G V2X system.

Aspects, features or objects of the disclosure are not limited to those described above. Other aspects, advantages, and salient features of the disclosure will become apparent to those skilled in the art from the following description.

In accordance with an aspect of the present disclosure, a method of a terminal in a wireless communication system is provided. The method comprises receiving, from an access and mobility management function (AMF), mapping information regarding mapping between at least one vehicle to everything (V2X) service type and at least one radio access technology (RAT) type; determining at least one RAT type corresponding to a V2X message to be transmitted, based on the mapping information; and transmitting the V2X message using the determined at least on RAT type.

In one embodiment, the transmitting the V2X message comprises: transmitting the V2X message using at least one of a long term evolution (LTE) RAT or a next generation (NR) RAT, in case that the determined at least on RAT type corresponding to the V2X message is the LTE RAT and the NR RAT.

In one embodiment, the receiving the mapping information comprises: transmitting, to the AMF, a registration request message; and receiving, from the AMF, a registration response message including the mapping information received from a policy control function (PCF) stored in an user data repository (UDR), in response to the registration request message.

In one embodiment, the determining the at least one RAT type is performed by a V2X layer of the terminal.

In one embodiment, the receiving the mapping information comprises: receiving, from the AMF, a user equipment (UE) configuration update message including the mapping information, in case that a UE policy update is triggered by a policy control function (PCF).

The present disclosure also provides a method of an access and mobility management function (AMF) in a wireless communication system. The method comprises receiving, from a policy control function (PCF), mapping information regarding mapping between at least one vehicle to everything (V2X) service type and at least one radio access technology (RAT) type; and transmitting, to a terminal, the mapping information for the terminal to determine at least one RAT type corresponding to a V2X message to be transmitted and transmit the V2X message using the determined at least on RAT type.

In one embodiment, the receiving the mapping information comprises: receiving, from the terminal, a registration request message; transmitting, to the PCF, a policy request message; and receiving, from the PCF, a policy response message including the mapping information received from an user data repository (UDR), and the transmitting the mapping information comprises transmitting, to the terminal, a registration response message including the mapping information.

In one embodiment, the receiving the mapping information comprises receiving, from the PCF, a policy update message including the mapping information, in case that a UE policy update is triggered by a policy control function (PCF), and the transmitting the mapping information comprises transmitting, to the terminal, an user equipment (UE) configuration update message including the mapping information.

The present disclosure also provides a terminal comprising a transceiver; and a controller coupled with the transceiver and configured to: receive, from an access and mobility management function (AMF), mapping information regarding mapping between at least one vehicle to everything (V2X) service type and at least one radio access technology (RAT) type, determine at least one RAT type corresponding to a V2X message to be transmitted, based on the mapping information, and transmit the V2X message using the determined at least on RAT type.

The present disclosure also provides an AMF comprising a transceiver; and a controller coupled with the transceiver and configured to: receive, from a policy control function (PCF), mapping information regarding mapping between at least one vehicle to everything (V2X) service type and at least one radio access technology (RAT) type, and transmit, to a terminal, the mapping information for the terminal to determine at least one RAT type corresponding to a V2X message to be transmitted and transmit the V2X message using the determined at least on RAT type.

According to an embodiment of the disclosure, a vehicle terminal can utilize a vehicle communication service provided by the 5G V2X system. Here, the vehicle terminal may be a device embedded in the vehicle, or may be a terminal attached to the vehicle such as a smartphone or a dashboard camera.

According to an embodiment of the disclosure, the V2X application server (AS) provides the V2X service provisioning information to the terminal, making the roaming interface between the V2X control functions defined in the LTE V2X system unnecessary. In addition, the method of causing the V2X AS to provide the service provisioning information is applicable to other vertical services other than V2X.

According to an embodiment of the disclosure, by defining the V2X network slice, a third party service provider other than the mobile network operator can provide the V2X network slice. Here, examples of the third party service provider may include a vehicle manufacturer or a terminal manufacturer. Also, a third party service provider may rent the V2X network slice from the mobile network operator to utilize the V2X network slice. That is, the mobile network operator may install, operate, and manage the V2X network slice, and a third party service provider may rent the V2X network slice from the mobile network operator for utilization.

According to an embodiment of the disclosure, the V2X service provider (SP) can provide 5G-specific services.

Features or advantages of the disclosure are not limited to those described above. Other advantages and salient features of the disclosure will become apparent to those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates examples of S-NSSAIs indicating V2X service characteristics and V2X slices according to an embodiment of the disclosure;

FIG. 9 illustrates an example of a mapping between V2X services and RAT types according to an embodiment of the disclosure;

FIG. 15 illustrates an example of a mapping between V2X services and frequency bands according to an embodiment of the disclosure;

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments and operations of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description, the terms for identifying or indicating access nodes, network entities, messages, interfaces between network entities, and various types of identification information are illustrated for ease of explanation. Hence, the disclosure is not limited to the following terms, and different terms referring to objects having equivalent technical meanings can be used.

In the description, the terms and names defined in the standards for the 5G system are used for ease of explanation. However, the disclosure is not limited by those terms and names, and can also be applied to systems conforming to other standards.

The following description of the embodiments is focused on 3GPP communication standards. However, it should be understood by those skilled in the art that the subject matter of the disclosure is applicable to other communication systems having similar technical backgrounds without significant modifications departing from the scope of the disclosure.

Embodiment A

Figure 1:
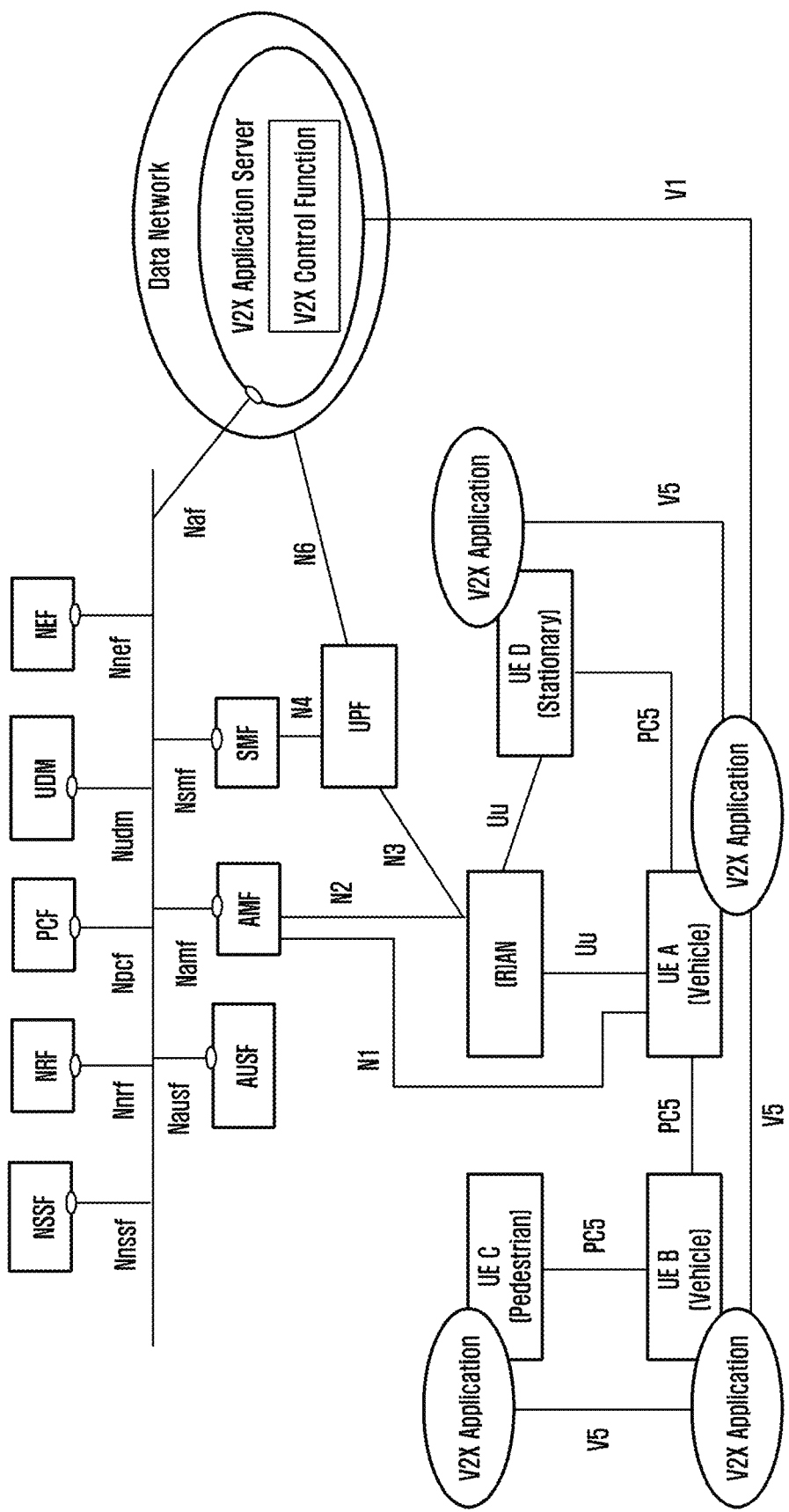
FIG. 1 illustrates an example of a 5G-based V2X system architecture with service-based interfaces between the network functions according to an embodiment of the disclosure.
Figure 2:
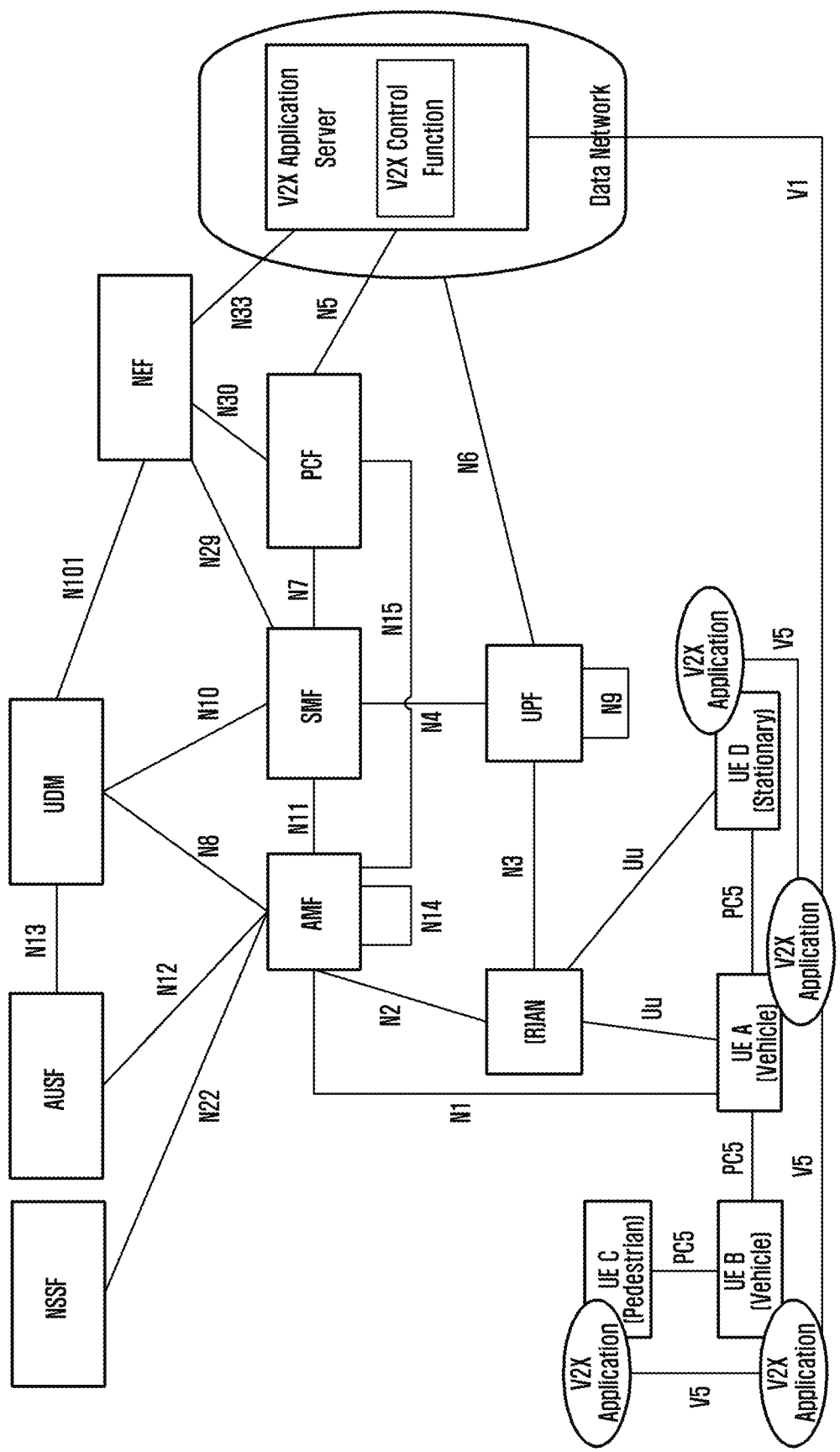
FIG. 2 illustrates an example of another 5G-based V2X system architecture with one-on-one reference points between the network functions according to an embodiment of the disclosure.

FIG. 1 illustrates a structure diagram of a 5G-based V2X system architecture with service-based interfaces between the network functions (NFs) according to an embodiment of the disclosure. FIG. 2 illustrates a structure diagram of another 5G-based V2X system architecture with one-on-one reference points between the network functions according to an embodiment of the disclosure.

With reference to FIG. 1, the V2X AS (application server) provides its services to other NFs via the Naf interface. The network exposure function (NEF) provides its services to other NFs via the Nnef interface. The PCF provides its services to other NFs via the Npcf interface.

FIG. 2 illustrates a structure diagram of the 5G-based V2X system architecture shown in FIG. 1 with one-on-one reference points between the NFs. The NEF communicates with the V2X AS via the N33 reference point. The PCF communicates with the V2X AS via the N5 reference point.

FIGS. 1 and 2 illustrate the same 5G-based V2X system architecture, which are schematically illustrated in different ways depending on the types of interfaces used between the NFs. In the following description, the interfaces shown in FIGS. 1 and 2 can be used together. The disclosure will be described based on FIG. 1 for ease of description, but the description of the disclosure is equally possible based on FIG. 2.

In FIG. 1, UE A and UE B represent a vehicle terminal, UE C represents a pedestrian terminal, and UE D represents a road side unit (RSU) being a stationary fixed terminal. Depending on the type of service being described, the (R)AN may be referred to as an access network (AN) to which a terminal accesses for a V2N service or to an RSU for a V2I service. Here, the vehicle terminal may be a device embedded in the vehicle, or a terminal attached to the vehicle such as a smartphone or a dashboard camera.

With reference to FIG. 1, there may be a V2N (vehicle to network) service between the vehicle terminal (UE A) and the V2X application server (AS), a V2I (vehicle to infrastructure) service between the vehicle terminal (UE A) and the RSU (UE D), a V2V (vehicle to vehicle) service between the vehicle terminal (UE A) and the vehicle terminal (UE B), and a V2P (vehicle to pedestrian) service between the vehicle terminal (UE B) and the pedestrian terminal (UE C).

In FIG. 1, UE A and UE D are connected to the 3GPP network via the Uu reference point. Here, the (R)AN to which UE A and UE D are connected may refer to a 3GPP radio access network (RAN) or to a non-3GPP access network (AN) such as WIFI. That is, UE A and UE D may access the 3GPP network via a 3GPP RAN or a non-3GPP AN such as WIFI.

With reference to FIG. 1, UE B and UE C can directly communicate with each other through the PC5 reference point (device-to-device (D2D) communication) without being connected to the 3GPP network. In addition, UE A and UE D can access the 3GPP network through the Uu reference point and can directly communicate with another terminal through the PC5 reference point.

In one embodiment, UE A in FIG. 1 can communicate with the V2X AS via the V1 reference point to receive a V2N service. The V1 reference point is a logical reference point. For the actual data transmission between UE A and the V2X AS, the uplink data may be transmitted via the Uu reference point from UE A to the (R)AN, the N3 reference point from the (R)AN to the UPF, and the N6 reference point from the UPF to the data network, and the downlink data may be transmitted from the V2X AS to UE A over the reverse path.

In one embodiment, UE A in FIG. 1 may communicate with the (R)AN via the Uu reference point or may communicate with UE D being a fixed stationary terminal through the PC5 reference point to receive a V2I service. Here, the (R)AN and UE D may act as an RSU and provide a V2I service to UE A.

In one embodiment, UE A and UE B in FIG. 1 can communicate through the PC5 reference point to receive a V2V service.

In one embodiment, UE C and UE B in FIG. 1 can communicate through the PC5 reference point to receive a V2P service.

In one embodiment, the V2X AS in FIG. 1 can provide a V2X control function. The V2X control function may include a function of providing the terminal with parameter information used for the V2X service.

The V2X service parameters managed by the V2X AS may include authentication information, radio parameter information for receiving a V2X service when the terminal is located outside the network coverage, and policy parameter information for providing a V2X service.

The authentication information managed by the V2X AS may include information indicating whether the terminal has a capability to use a service provided by the V2X AS, information indicating the service available to the terminal among the services provided by the V2X AS in the case of the terminal being capable, information indicating whether the terminal can use a V2X service based on D2D communication, information indicating whether the terminal can use a V2X service based on multicast/broadcast communication (e.g., MBMS), information indicating whether the terminal can use a V2X service based on D2D communication outside the network coverage, and a list of mobile network operators (e.g., PLMN) capable of providing a V2X service to the terminal.

The information indicating the service available to the terminal among the services provided by the V2X AS may indicate whether the terminal can use a V2P service, whether the terminal can use a V2V service, whether the terminal can use a V2I service, whether the terminal can use a V2N service, or whether the terminal can use all the V2X services provided by the V2X AS. The information indicating the service available to the terminal among the services provided by the V2X AS may also indicate information on the service IDs available to the terminal among the service IDs (e.g., PSID or ITS-AID) mapped to the individual V2X services.

The radio parameter information for receiving a V2X service when the terminal managed by the V2X AS is located outside the network coverage may include information on the radio frequency and the region to use the radio frequency. When the terminal is located outside the network coverage, it can receive a V2X service by using the radio parameter information stored in advance.

The policy parameter information managed by the V2X AS for providing the V2X service may include a service ID (e.g., PSID or ITS-AID) indicating a V2X service and a corresponding destination layer-2 ID, packet priority information (e.g., ProSe per-packet priority (PPPP)) and corresponding packet delay budget information, a list of V2X services requiring privacy, and a V2X service type (e.g., V2V, V2P, V2I or V2N) or V2X service ID (e.g., PSID or ITS-AID) and V2X frequency information needed to use the corresponding service. The terminal can transmit a V2X message through the PC5 reference point by setting the destination address to the destination layer-2 ID corresponding to the ID of a desired V2X service. The neighboring vehicle or RSU terminal having subscribed to the corresponding service can process the V2X message based on the destination layer-2 ID thereof. In addition, the terminal can transmit a V2X message whose packet priority corresponds to the packet delay budget through the PC5 reference point. For example, in the case of an emergency V2X message, a small delay budget is used and a corresponding high priority value can be set in the emergency V2X message. In the case of a non-emergency message, a small delay budget is not required and a corresponding low priority value can be set in the corresponding V2X message.

In one embodiment, the V2X AS in FIG. 1 may provide the terminal with the V2X service parameters managed by it.

Figure 3:
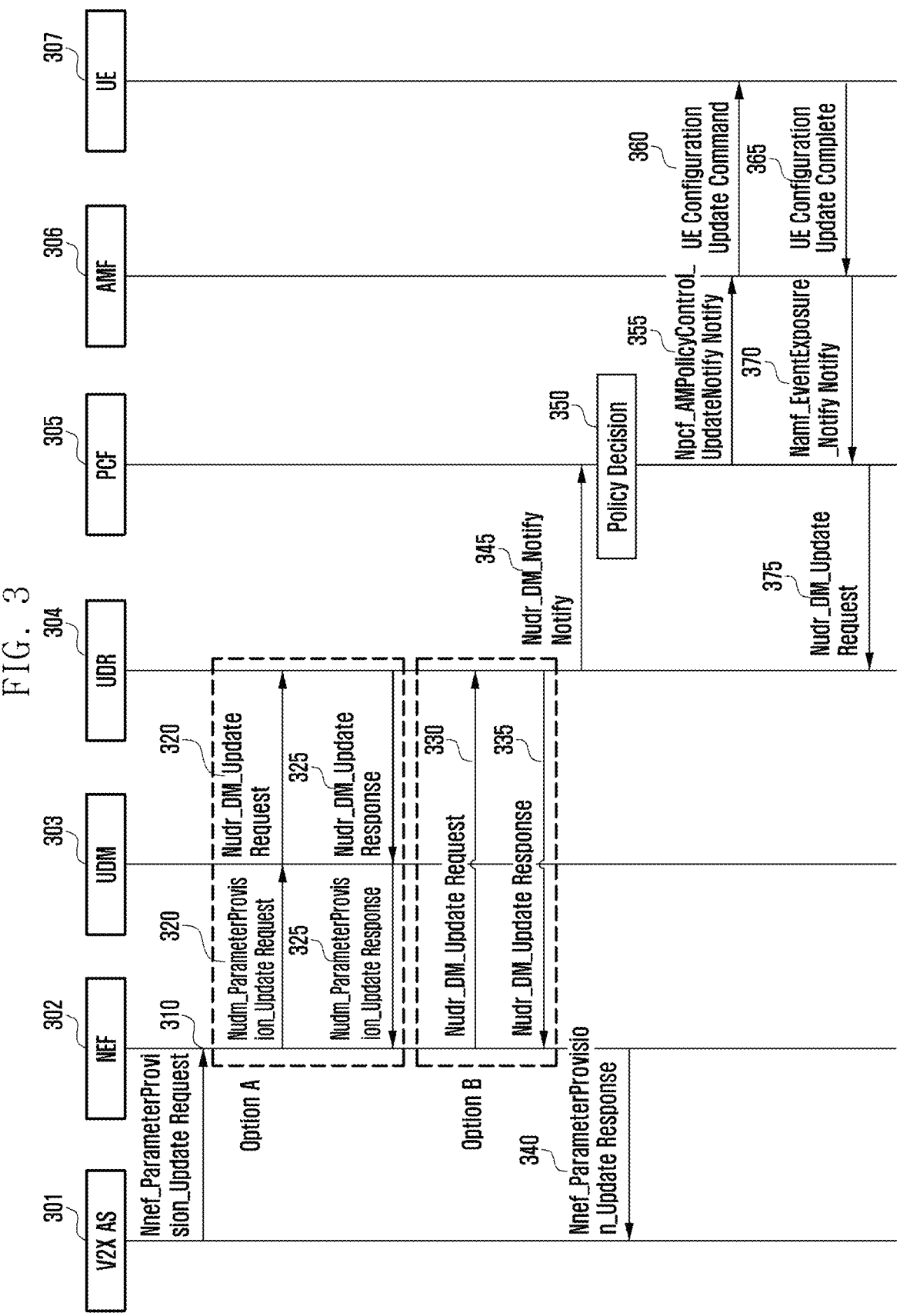
FIG. 3 illustrates a procedure for providing V2X service parameters from the V2X AS to the terminal (UE) according to an embodiment of the disclosure.

FIG. 3 illustrates a procedure for the V2X AS to provide V2X service parameters to the terminal according to an embodiment of the disclosure.

With reference to FIG. 3, in one embodiment, the V2X AS 301 may provide the V2X service parameters managed by it to the NEF 302 (step 310). Here, the communication between the V2X AS 301 and the NEF 302 may be performed via the Nnef service based interface shown in FIG. 1 or the N33 reference point shown in FIG. 2.

In one embodiment, the NEF 302 may store the V2X service parameters received from the V2X AS 301 in the UDR 304 (steps 320, 325, 330 and 335). Here, it is possible to use Option A in which the NEF 302 stores the V2X service parameters in the UDR 304 via the UDM 303 (steps 320 and 325) and Option B in which the NEF 302 directly stores the V2X service parameters in the UDR 304 (steps 330 and 335). In Option A, the communication between the NEF 302 and the UDM 303 may be performed using the Nudm service-based interface shown in FIG. 1, and the communication between the UDM 303 and the UDR 304 may be performed via the Nudr service-based interface shown in FIG. 1 or via the N101 reference point shown in FIG. 2. For example, the NEF 302 may transmit a message (e.g., Nudm_ParameterProvision_Update Request) containing the V2X service parameters received from the V2X AS 301 to the UDM 303, and the UDM 303 may transmit a message (e.g., Nudr_DM_Update Request) containing the V2X service parameters received from the NEF 302 to the UDR 304 (step 320). Then, as a reply, the UDR 304 may transmit a response message (e.g., Nudr_DM_Update Response) to the UDM 303, and the UDM 303 may transmit a response message (e.g., Nudm_ParameterProvision_Update Response) to the NEF 302 (step 325). In Option B, the communication between the NEF 302 and the UDR 304 may be performed via the Nudr service-based interface shown in FIG. 1. For example, the NEF 302 may transmit a message (e.g., Nudr_DM_Update Request) containing the V2X service parameters received from the V2X AS 301 to the UDR 304 (step 330). Then, as a reply, the UDR 304 may transmit a response message (e.g., Nudr_DM_Update Response) to the NEF 302 (step 335).

In one embodiment, after storing the V2X service parameters in the UDR 304, the NEF 302 can notify the V2X AS 301 of whether the parameter information is successfully updated (step 340).

In one embodiment, when the V2X service parameter information is updated in the UDR 304, the UDR 304 can notify the PCF 305 of the updated information (step 345). To this end, the PCF 305 may request an event subscription to the UDR 304 in advance. The types of events requested by the PCF 305 to the UDR 304 may include updating the policy information of the V2X service, updating the terminal policy information related to the V2X service, updating the policy information of the terminal, and the like. Here, the communication between the UDR 304 and the PCF 305 may be performed via the Nudr service-based interface shown in FIG. 1.

In one embodiment, upon receiving the updated V2X service parameter information of the terminal from the UDR 304, the PCF 305 may determine whether to transmit the updated V2X service information to the terminal 307 (step 350).

In one embodiment, upon receiving the updated V2X service parameter information of the terminal 307 from the UDR 304, the PCF 305 may process the corresponding information and store the processed information in the UDR 304 again (step 375).

In one embodiment, the PCF 305 may provide V2X service parameter information to the terminal 307 via the AMF 306 (steps 355 and 360). The V2X service parameter information may be information received by the PCF 305 from the UDR 304 at step 345 or may be a processed version of the information received by the PCF 305 from the UDR 304 at step 345. Here, the communication between the PCF 305 and the AMF 306 may be performed via the Npcf service-based interface shown in FIG. 1 or the N15 reference point shown in FIG. 2. The communication between the AMF 306 and the UE 307 may be performed via the N1 reference point shown in FIG. 1. Here, the N1 reference point is a logical reference point, and the actual data can be transmitted to the terminal 307 via the N2 reference point and the Uu reference point.

In one embodiment, upon receiving the V2X service parameter information, the terminal 307 may store the received information and transmit a reply message indicating successful reception of the V2X service parameter information to the network (step 365). The AMF 306 may notify the PCF 305 that the V2X service parameter information has been successfully transmitted to the terminal 307 (step 370).

Figure 4:
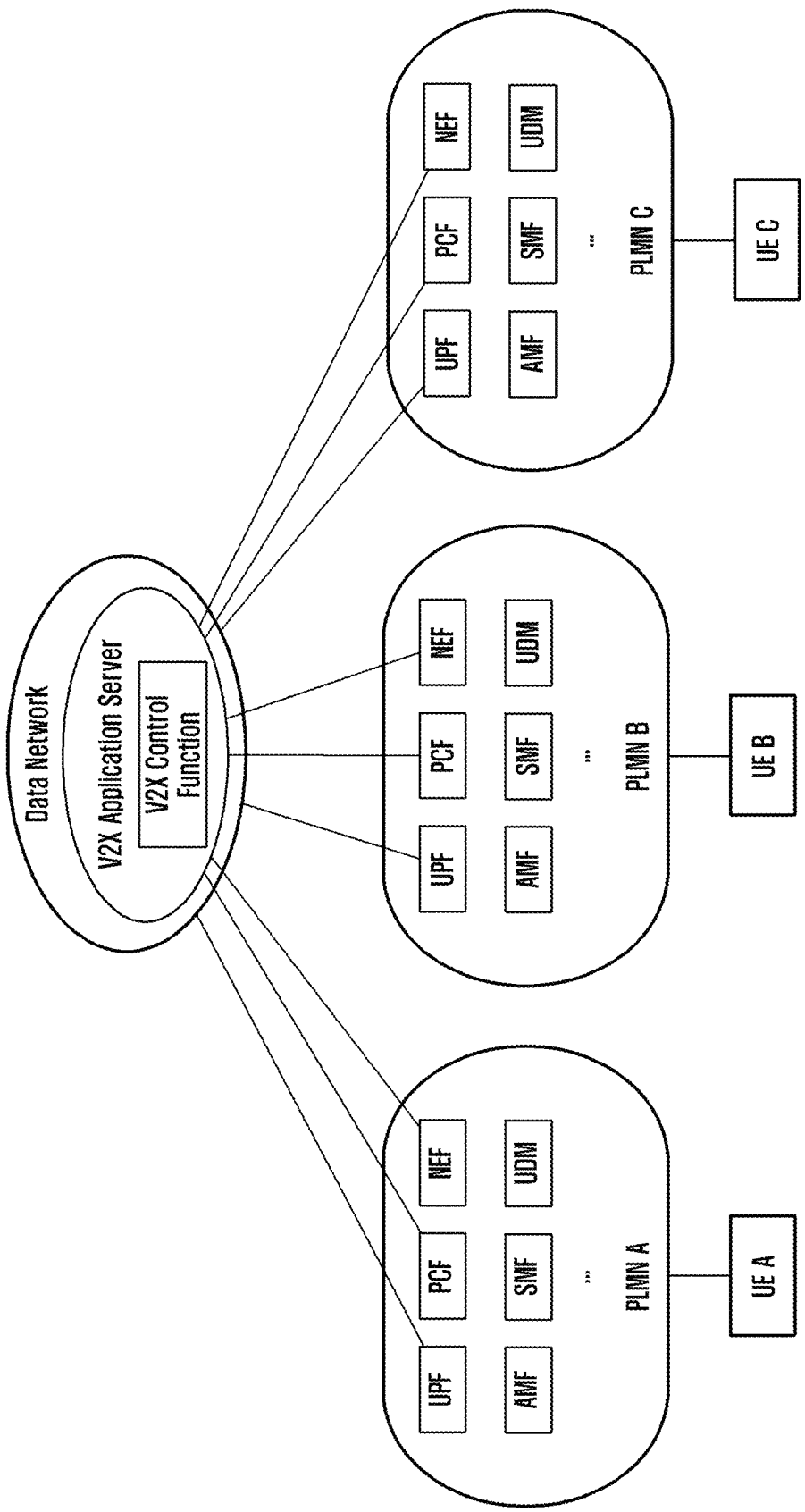
FIG. 4 illustrates a structure in which the V2X AS is connected to plural mobile network operators according to an embodiment of the disclosure.

FIG. 4 illustrates a structure in which the V2X AS is connected to plural mobile network operators according to an embodiment of the disclosure.

One V2X AS can be connected to the NEFs of multiple PLMNs. The V2X AS can provide V2X service parameters to V2X service terminals (e.g., vehicle terminal, pedestrian terminal, and RSU) of each PLMN in a manner shown in FIG. 3. Here, the V2X AS can manage common V2X service parameters and provide the same to the terminal independently of the PLMN to which the terminal has subscribed. Alternatively, the V2X AS may manage V2X service parameters for each PLMN to which the terminal has subscribed and provide the UE with the V2X service parameters corresponding to the PLMN to which the terminal has subscribed.

In one embodiment, the V2X AS provides the V2X service parameters to the terminal. Hence, the burden of managing the service parameter information can be reduced in the PLMN. In addition, the need for the roaming interfaces and associated procedures to support roaming terminals is reduced at the PLMN level. That is, to support roaming terminals, the V2X AS can provide relevant service parameter information to the terminal.

In one embodiment, the V2X AS can provision the V2X service parameter information to the terminal through the 3GPP NEF. The disclosure is not limited to the V2X service and is applicable to other services provided through the 3GPP network. For example, in the case of an IoT service, the IoT AS providing IoT services can provide a terminal with the parameter information to be provisioned to the terminal through the NEF. In the case of a smart factory service, the smart factory AS providing smart factory services can provide a terminal with the parameter information to be provisioned to the terminal through the NEF. In the case of a multicast broadcast service, the multicast broadcast AS providing multicast broadcast services can provide a terminal with the parameter information to be provisioned to the terminal through the NEF. Additionally, in the case of a public safety service, the MCPTT AS providing mission critical services can provide a terminal with the parameter information to be provisioned to the terminal through the NEF. That is, the method of delivering the information needed by a terminal for service provisioning to the terminal through the NEF is not limited to a specific service but can be applied to all the services.

Embodiment B

The terms "slice", "service", "network slice", "network service", "application slice", and "application service" may be used interchangeably in describing the embodiments of the disclosure.

The mobile network operator can allocate suitable network resources to a service for each slice or a set of slices. Here, the network resource may indicate a specific NF or a logical resource or radio resource provided by the NF.

Figure 5:
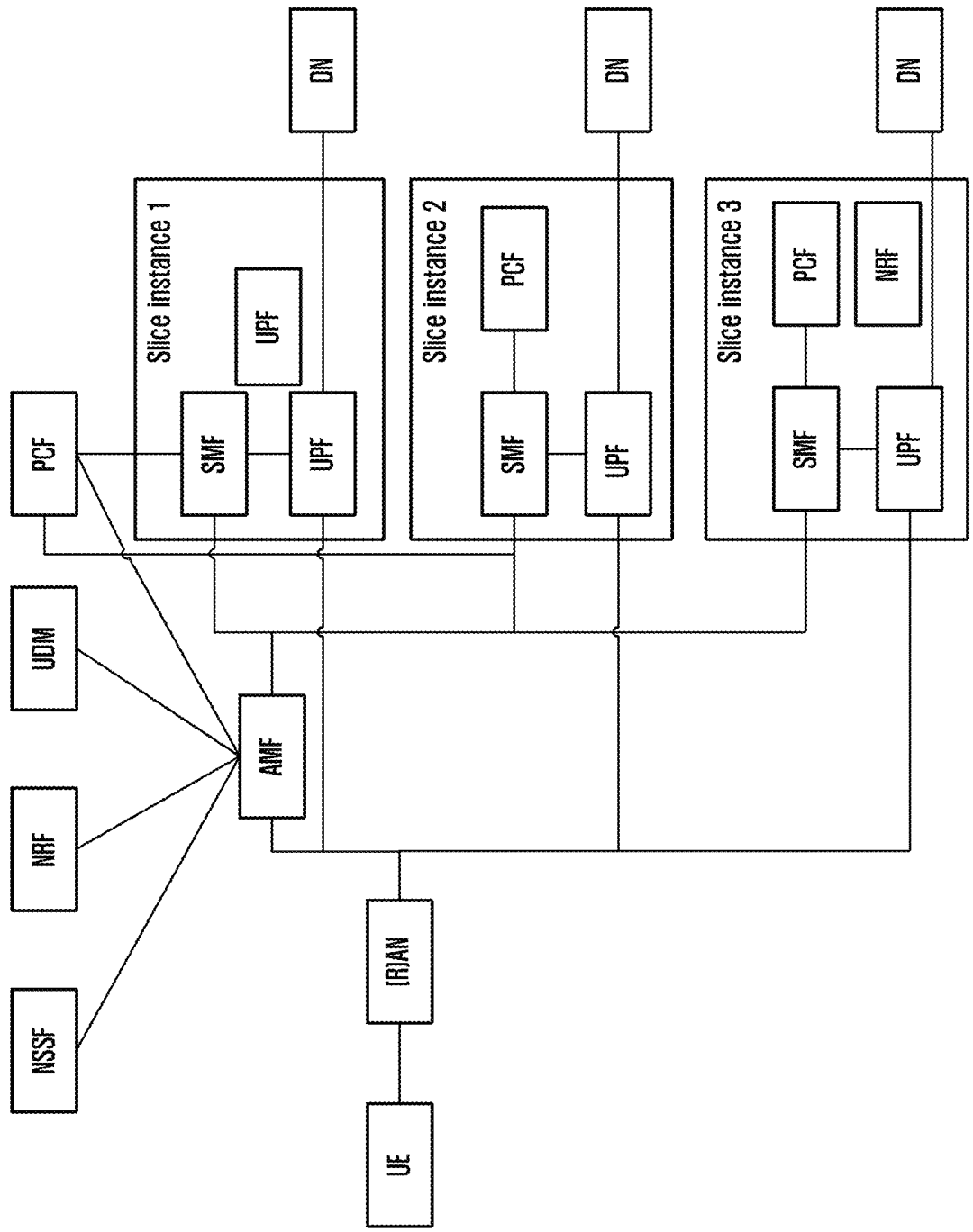
FIG. 5 illustrates a 5G network slice structure according to an embodiment of the disclosure.

FIG. 5 illustrates a 5G network slice structure according to an embodiment of the disclosure.

The PLMN may provide multiple network slices, and each network slice may be provided to the terminal in the form of a slice instance. The terminal can connect to the network and receive services from several slice instances at the same time. Each slice instance can be composed of the network resources needed to provide the corresponding network slice.

For example, slice instance 1 is composed of the SMF and the UPF, and slice instance 2 is composed of the SMF, the UPF, and the PCF. In FIG. 5, the SMF of slice instance 2 may have an association with the PCF at the PLMN level and the PCF at the slice level. The PCF at the PLMN level can provide the policy information of the corresponding PLMN to the SMF. The slice-level PCF belonging to slice instance 2 may manage the policies used to provide the corresponding slice and may provide the corresponding information to the SMF.

Each slice can be identified by a slice ID. An example of the slice ID may be the S-NSSAI (single-network slice selection assistance information) defined by 3GPP.

Figure 6:
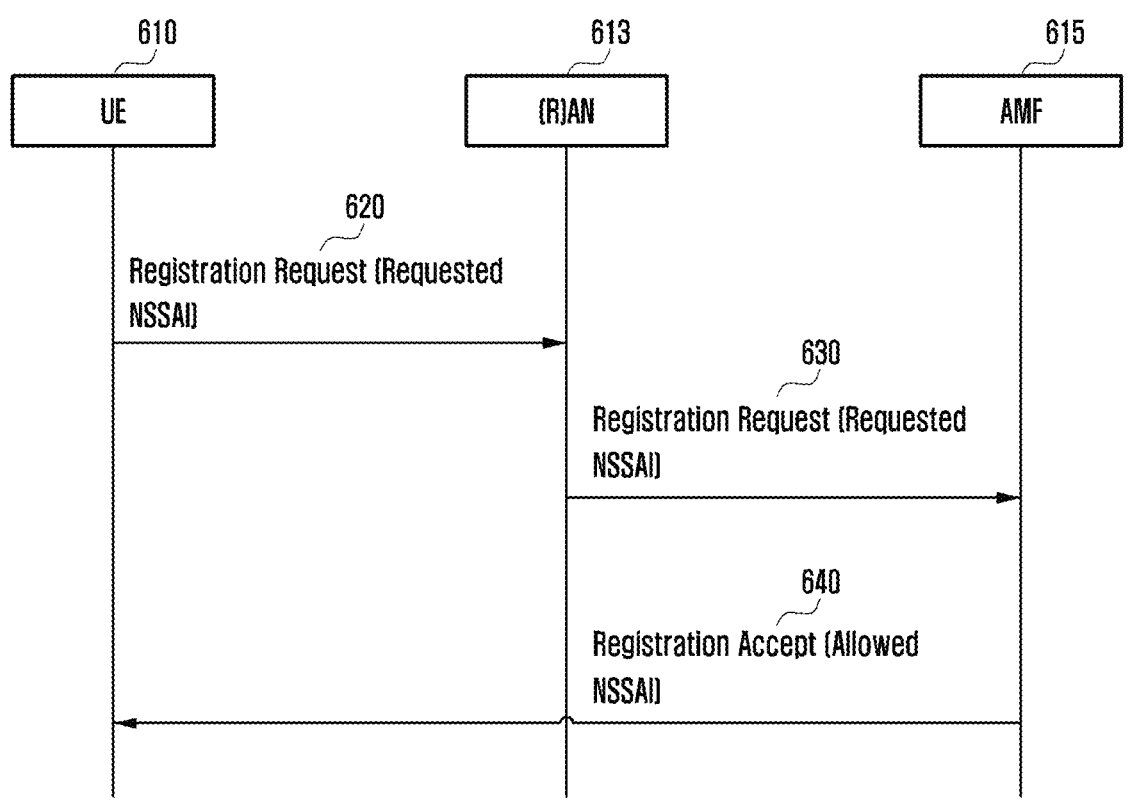
FIG. 6 illustrates a procedure for using a slice ID (S-NS-SAI) when the terminal accesses a 3GPP network according to an embodiment of the disclosure.

FIG. 6 illustrates a procedure for using a slice ID when the terminal accesses a 3GPP network according to an embodiment of the disclosure.

With reference to FIG. 6, the terminal 610 transmits a registration request message to the AMF 615 via the AN 613 to access the network (steps 620 and 630). At this time, the terminal 610 may include the desired slice information (requested NSSAI) in the registration request message. The requested NSSAI may include a list of S-NSSAIs. That is, the terminal 610 wishing to use a V2X service can send the AMF 615 the requested NSSAI including the S-NSSAI indicating the V2X slice by use of a registration request message. Upon receiving the registration request message, the AMF 615 determines whether the terminal 610 is allowed to use the requested slice (requested NSSAI) and transmits a registration accept message containing information on the slice available to the terminal (allowed NSSAI) to the terminal 610 (step 640).

FIG. 7 illustrates examples of S-NSSAIs indicating V2X service characteristics and V2X slices according to an embodiment of the disclosure.

With reference to FIG. 7, the slice/service type (SST) for providing a V2X service can be V2X, V2N, V2I, V2V, V2P, or the like. The V2X SST values can represent vehicle communication services including V2N, V2I, V2V and V2P services. Vehicle communication services defined by standardization bodies other than 3GPP (e.g., DSRC, WAVE, and ITS) can also be identified by the SST values. As described above, the SST for providing the V2X services can be applied to various vehicle communication services without being limited to the services described in the disclosure.

In FIG. 7, the SST for each V2X service may have its own SST value. One S-NSSAI for a V2X service is composed of an SST value and an SD (slice differentiator) value. The SST value of an S-NSSAI refers to a V2X service, and the SD value thereof can refer to additional information other than the V2X service. In one embodiment, the SD value may indicate a vehicle manufacturer (e.g., BMW, Audi, Hyundai, or Toyota), a terminal manufacturer (e.g., Samsung, or Apple), a V2X service provider, or a mobile network operator (e.g., SKT, KT, AT&T, or Deutsche Telekom). The SD value is optional and may be not included in the S-NSSAI.

In one embodiment, when a terminal (e.g., vehicle terminal, pedestrian terminal, or RSU) using a V2X service accesses the 3GPP network, it can transmit a registration request message containing a desired V2X slice ID (i.e., S-NSSAI indicating a desired V2X slice). This process is depicted in FIG. 6. An S-NSSAI indicating a V2X slice included in the registration request message is illustrated in FIG. 7. For example, a Toyota vehicle terminal having subscribed to the V2N service and the V2V service may include the following requested slice information (requested NSSAI) in the registration request message.

Requested NSSAI: {(V2X, Toyota)}

In the above example, the V2X service may be a service for a Toyota vehicle, and the SST value is "V2X" and the SD value is "Toyota" being a vehicle manufacturer. The requested slice information may include S-NSSAIs for V2V and V2N services instead of the S-NSSAI for a V2X service.

Requested NSSAI: {(V2N, Toyota), (V2V, –)}

In the above example, the V2X slice may be a service for a Toyota vehicle, and the SST value is "V2N" and the SD value is "Toyota" being a vehicle manufacturer. Also, in the above example, the V2V slice may be provided regardless of the terminal type, and the SST value may be "V2V" and the SD value may be not included. Upon receiving the requested slice (requested NSSAI) information from the terminal, the AMF determines whether the slice requested by the terminal is available and may transmit the terminal a registration accept message containing information on the slice available to the terminal (allowed NSSAI). The allowed NSSAI may have the same value as the requested NSSAI.

In one embodiment, the SST value or SD value constituting the S-NSSAI can be used only in the NF of the PLMN that has defined the S-NSSAI. That is, the NF of the PLMN that has not defined the S-NSSAI may be unable to interpret the SST value or the SD value of the S-NSSAI. To use the LTE or 5G V2X service, a V2X terminal subscribes to a PLMN that can provide the V2X service. The PLMN to which the terminal has subscribed may be referred to as the home PLMN (HPLMN). The HPLMN provides the S-NSSAI value for the V2X slice to the V2X terminal. When the V2X terminal connects to the network, it transmits a registration request message containing the S-NSSAI value received from the HPLMN to the AMF. Because the AMF is the NF of the HPLMN having allocated the S-NSSAI, the AMF can interpret the SST and SD values included in the S-NSSAI and select the V2X slice corresponding to the SST and SD values. In one embodiment, when the V2X terminal roams into the VPLMN (visited PLMN), the V2X terminal can transmit a registration request message including the S-NSSAI provided by the HPLMN to the AMF of the VPLMN. Because the AMF having received the registration request message is the NF of the VPLMN, it may be unable to interpret the SST value or the SD value included in the S-NSSAI received from the terminal. If the AMF cannot interpret both the SST value and the SD value, the S-NSSAI requested by the terminal may be rejected and the S-NSSAI may be not included in the allowed NSSAI contained in the registration accept message. If the AMF can interpret the SST value only and cannot interpret the SD value, the AMF may select a V2X slice corresponding to the SST value while ignoring the SD value and provide the selected V2X slice to the terminal.

Figure 8:
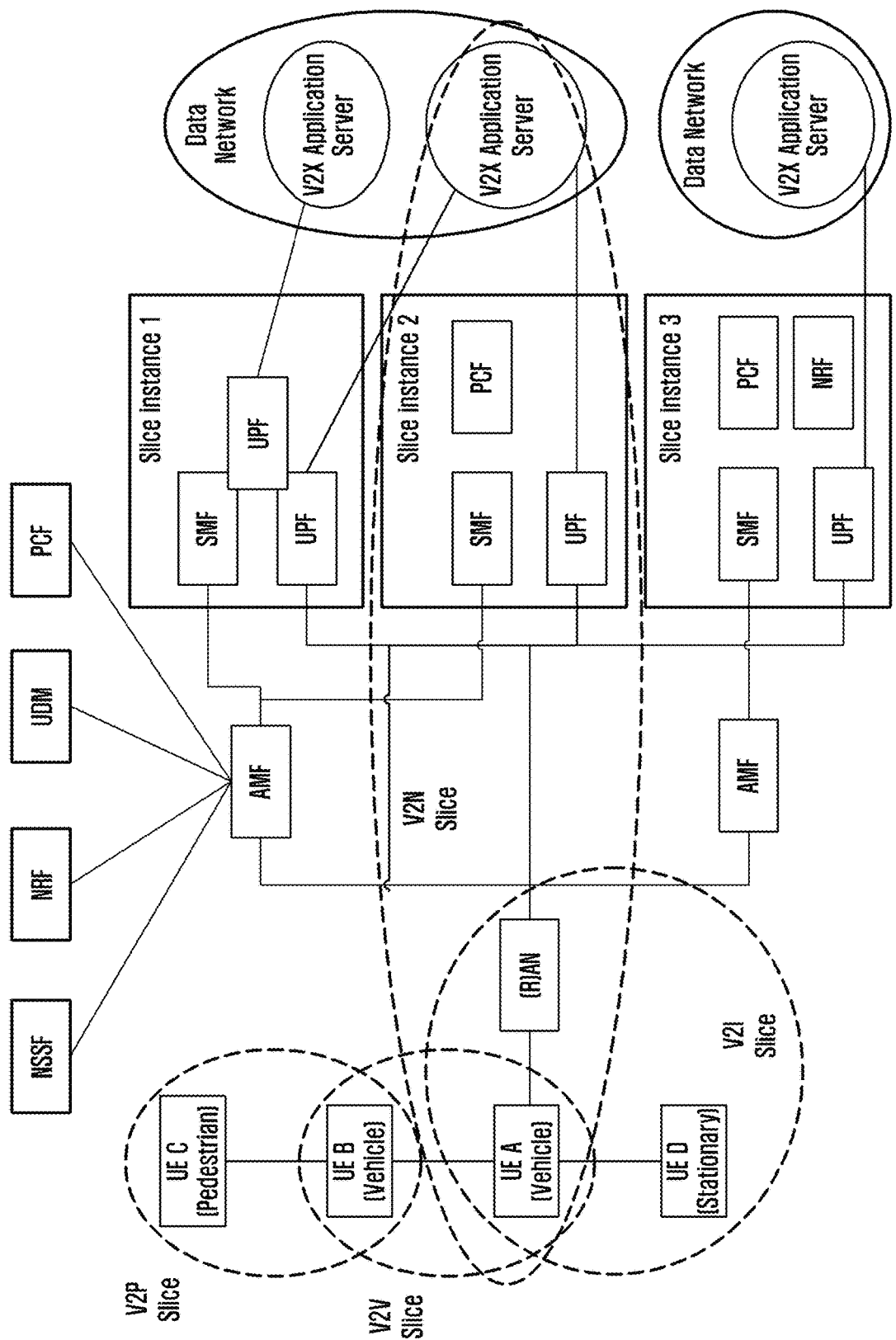
FIG. 8 illustrates a structure diagram of 5G-based V2X slices according to an embodiment of the disclosure.

FIG. 8 illustrates a structure diagram of 5G-based V2X slices according to an embodiment of the disclosure.

In one embodiment, with reference to FIG. 8, the V2N slice may include a vehicle terminal (UE A) using a V2N service, an access network ((R)AN) to which the terminal is connected, 3GPP 5G core network functions (AMF, SMF and UPF), and the V2X AS. The V2I slice can include a vehicle terminal (UE A), an RSU terminal (UE D), and the (R)AN. The V2V slice may include vehicle terminals (UE A and UE B) that utilize the V2V service based on D2D communication. The V2P slice may include a vehicle terminal (UE A) and a pedestrian terminal (UE B).

Embodiment C

A V2X terminal conforming to the 3GPP standards may support a radio access technology (RAT) for D2D communication. The RAT types may include LTE (Long Term Evolution) and NR (New Radio), and may further include a RAT type to be defined by 3GPP in the future and a wireless network technology (e.g., WIFI) defined by a standardization body other than 3GPP. When a terminal supporting a plurality of RATs for D2D communication sends a V2X message, the terminal should select the most appropriate RAT for the corresponding V2X application.

In one embodiment, the V2X AS can select the appropriate RAT for each of the V2X services provided by the V2X AS. The V2X AS can manage information on the V2X services and associated RATs.

Figure 10:
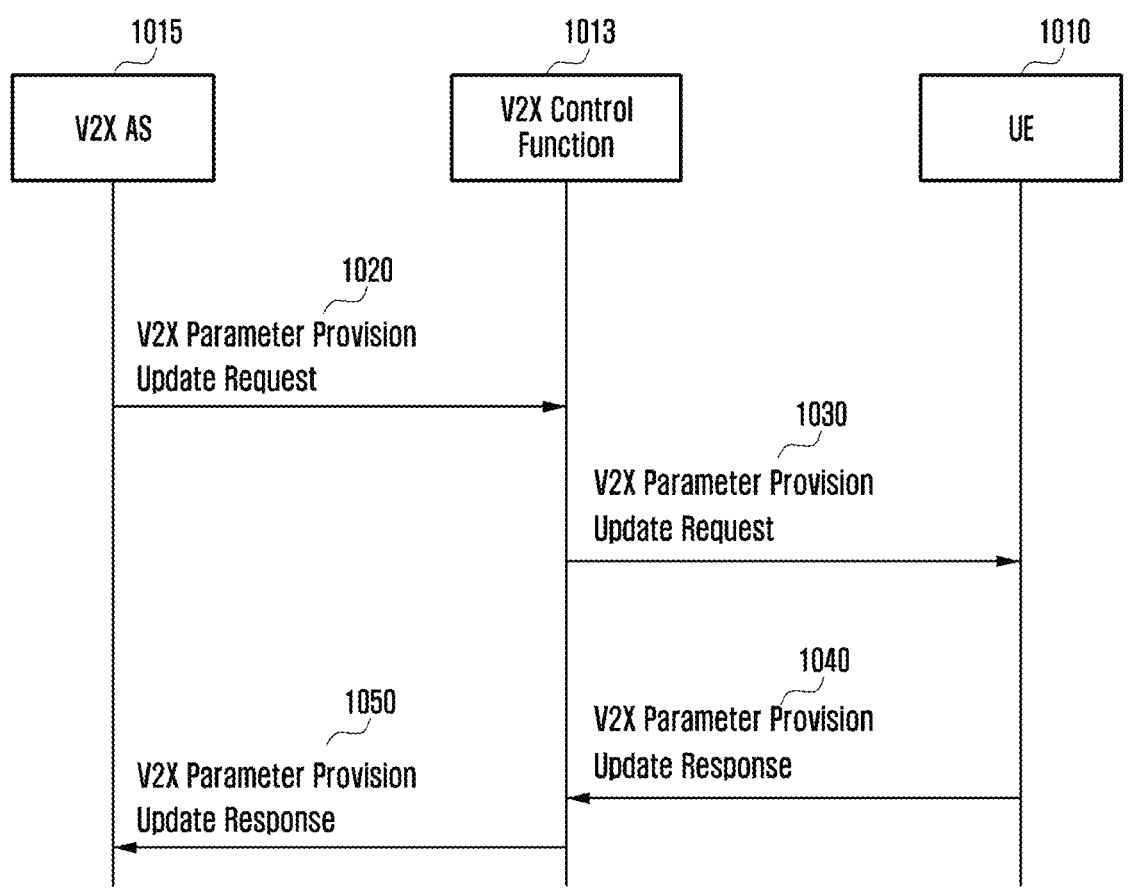
FIG. 10 illustrates a procedure for providing V2X service parameter information to the terminal according to an embodiment of the disclosure.
Figure 11:
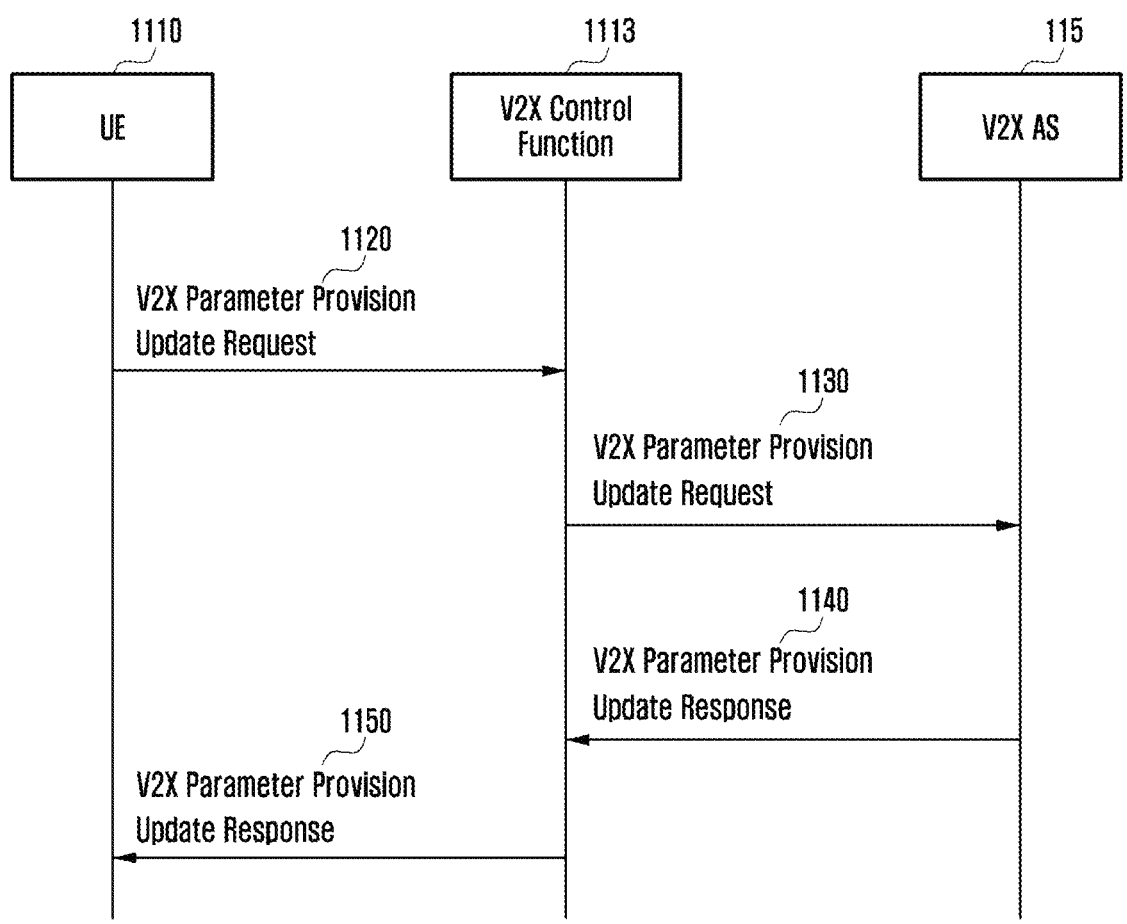
FIG. 11 illustrates a procedure for the terminal to request and obtain V2X service parameter information from the V2X AS according to an embodiment of the disclosure.
Figure 12:
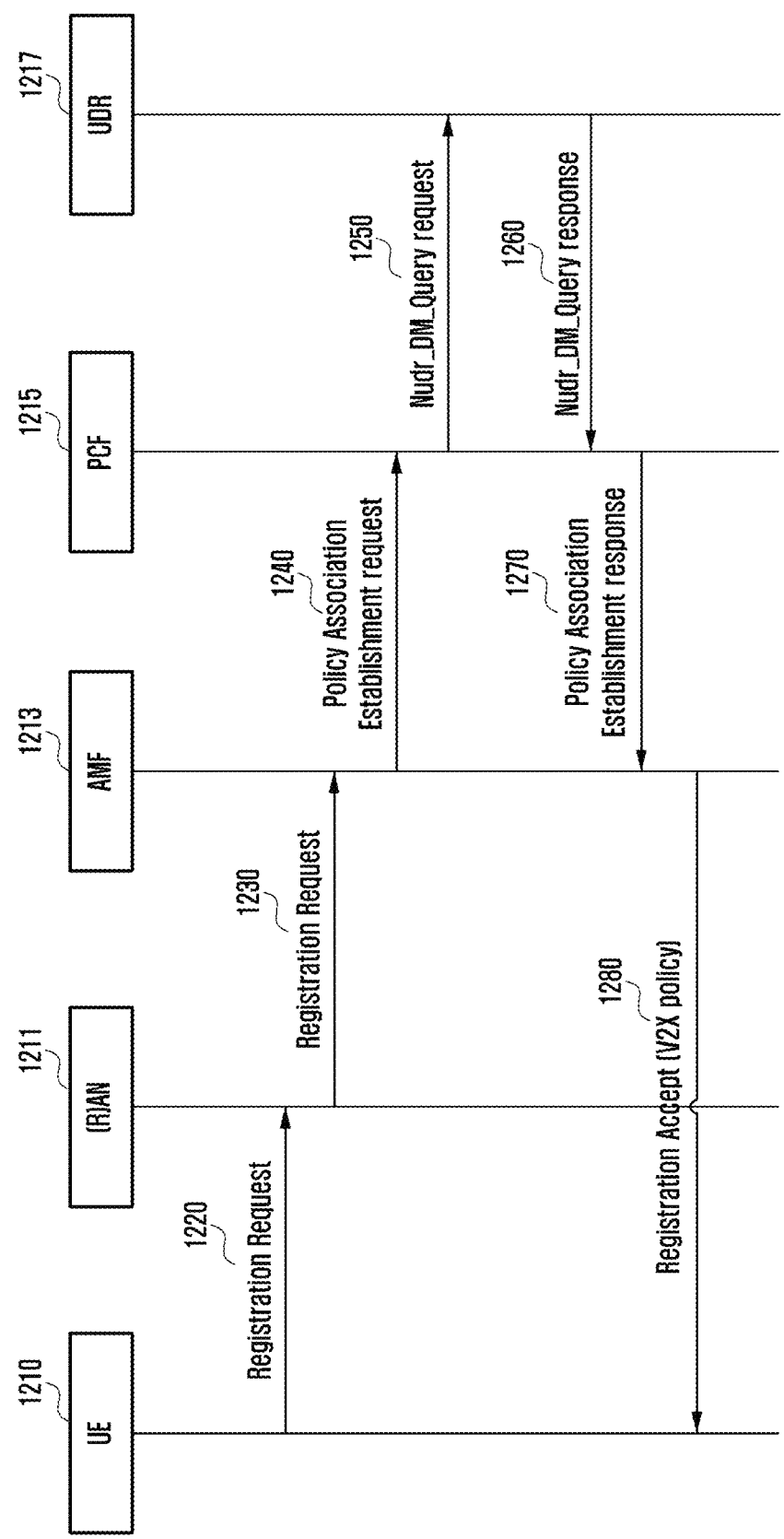
FIG. 12 illustrates a procedure for a terminal to obtain V2X service parameter information during the registration process according to an embodiment of the disclosure.

FIG. 9 illustrates an example of a mapping between V2X services managed by the V2X AS and RAT types according to an embodiment of the disclosure. FIG. 10 illustrates a procedure for providing V2X service parameter information to the terminal according to an embodiment of the disclosure. FIG. 11 illustrates a procedure for the terminal to request and obtain V2X service parameter information from the V2X AS according to an embodiment of the disclosure. FIG. 12 illustrates a procedure for a terminal to obtain V2X service parameter information during the registration process according to an embodiment of the disclosure.

In one embodiment, with reference to FIG. 9, the V2X service is identified by a service ID (e.g., PSID or ITS-AID), and can be associated with a RAT type for service provisioning. In the case of a basic safety message service, the V2X service ID is '0' and the terminal can select the LTE RAT to send a basic safety message. In the case of an event notification message service, which may be used by a V2X terminal in the event of an emergency to notify a nearby V2X terminal of a dangerous situation, the V2X service ID is '1' and the terminal can select the NR RAT to transmit an event notification message. In the case of an extended sensors service, the V2X service ID is '2' and the terminal may select at least one of the LTE RAT or the NR RAT to transmit an extended sensors service message. The mapping between the service types and the RAT types shown in FIG. 9 is an example for describing the disclosure, and does not mean that the basic safety message service is available only through the LTE RAT. Which RAT type is mapped to which V2X service type or V2X ID can be determined by the V2X service provider providing the V2X services.

In one embodiment, the V2X AS may provide the mapping information shown in FIG. 9 to the V2X terminal (UE) by using the procedure depicted in FIG. 3.

In one embodiment, the V2X AS may provide the mapping information shown in FIG. 9 to the V2X terminal (UE) by using the procedure depicted in FIG. 10.

With reference to FIG. 10, the V2X AS 1015 may provide the V2X control function 1013 being the NF for providing the V2X service with information on the mapping between the V2X applications and the RAT types shown in FIG. 9 (step 1020). The V2X control function 1013 may forward the mapping information to the terminal 1010 (step 1030). Here, the V2X control function 1013 may send the mapping information to the terminal 1010 by using a user plane data message. When the mapping information is transmitted using a user plane message, the data is transferred from the V2X control function 1013 to the UPF (not shown) and then is transmitted from the UPF to the terminal 1010 via the (R)AN (not shown). Alternatively, the V2X control function 1013 can send the mapping information to the terminal 1010 by using a NAS signaling message of the control plane. When the mapping information is transferred using a control plane message, the signaling data may be transferred from the V2X control function 1013 to the PCF (not shown) and then be transmitted from the PCF to the terminal 1010 via the AMF (not shown) and the (R)AN, or the signaling data may be transferred from the V2X control function 1013 to the AMF without passing through the PCF and then be transferred from the AMF to the terminal 1010 via the (R)AN. Upon receiving the mapping information, the terminal 1010 may transmit a response message to the V2 control function 1013 (step 1040), and the V2 control function 1013 can forward the response message to the V2X AS 1015 (step 1050).

In one embodiment, the V2X terminal 1110 may use the procedure depicted in FIG. 11 to send a request for information on the mapping between the V2X applications and the RAT types shown in FIG. 9 to the V2X AS 1115. Specifically, the terminal 1110 may send the V2X AS 1115 a request message for information on the mapping between the V2X applications and the RAT types (via the V2X control function 1113) (steps 1120 and 1130). Upon receiving the request message, the V2X AS 1115 may transmit a response message containing the requested mapping information to the terminal 1110 (via the V2X control function 1113) (steps 1140 and 1150).

With reference to FIG. 3, the V2X service parameter information provided by the V2X AS 301 may be stored in the UDR 304 via the NEF 302. Additionally, in one embodiment, the V2X terminal 1210 can use the procedure depicted in FIG. 12 to acquire the mapping information illustrated in FIG. 9 during the registration process.

With reference to FIG. 12, upon receiving a registration request message from the terminal 1210 (via the (R)AN 1211) (steps 1220 and 1230), the AMF 1213 may transmit a request for policy information associated with the terminal 1210 to the PCF 1215 (step 1240). The PCF 1215 may transmit a request for the VDR service parameters to be applied to the terminal 1210 to the UDR 1217 (step 1250). The UDR 1217 may provide the V2X service parameters stored at steps 320, 325, 330 and 335 of FIG. 3 to the PCF 1215 (step 1260). The mapping information illustrated in FIG. 9 may be included in the V2X service parameters. The PCF 1215 may provide policy information to be applied to the terminal 1210 to the AMF 1213 (step 1270), where the V2X service parameters received from the UDR 1217 may be included in the policy information. The AMF 1213 may transmit a registration accept message including the V2X service parameter information received from the PCF 1215 to the terminal 1210 (step 1280).

Figure 13:
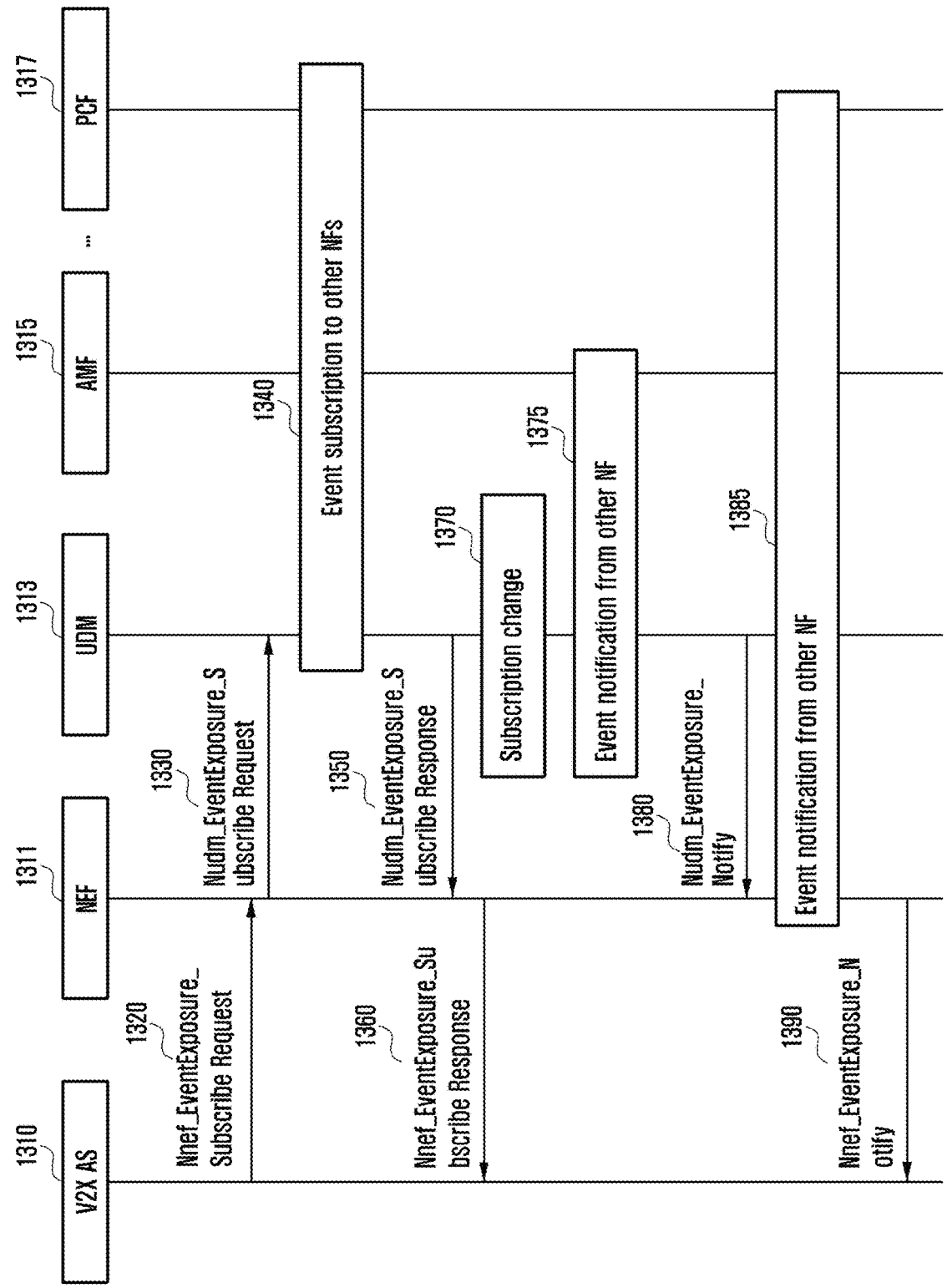
FIG. 13 illustrates a procedure for the V2X AS to obtain information on the terminal and V2X service from the network according to an embodiment of the disclosure.

FIG. 13 illustrates a procedure for the V2X AS to obtain information on the terminal and V2X service from the network according to an embodiment of the disclosure.

With reference to FIG. 13, to receive a changed information notification when an event occurs in relation to the terminal and the V2X service, the V2X AS 1310 may transmit an event exposure subscribe request message to the NEF 1311 (step 1320). The NEF 1311 may forward the event exposure subscribe request message received from the V2X AS 1310 to the UDM 1313 (step 1330). Based on the request message, the UDM 1313 may transmit an event subscription request to the associated NFs (e.g., AMF 1315, PCF 1317, and SMF) (step 1340). The UDM 1313 may send an event exposure subscribe response message indicating the success or failure of making the event subscription request to the NEF 1311 (step 1350), where the information related to the terminal and the V2X service may be included in the response message. The NEF 1311 can forward the response message received from the UDM 1313 to the V2X AS 1310 (step 1360). When the subscription information of the terminal is changed (step 1370) or an event notification is received from another NF to which an event subscription has been made at step 1340 (step 1375), the UDM 1313 can notify the NEF 1311 of the corresponding changed information (step 1380). The NEF 1311 may directly receive an event notification from another NF without passing through the UDM 1313 (step 1385). Upon receiving an event notification message from the UDM 1313 or another NF, the NEF 1311 may notify the V2X AS 1310 of the corresponding changed information (step 1390). According to the above procedure, the V2X AS 1310 can obtain information related to the terminal and the V2X service from the network, and obtain the changed information when a change is made to the above information. The terminal related information may include a RAT type available to the terminal. Based on the information about the RAT type available to the terminal obtained from the network, the V2X AS server 1310 may generate a mapping table specifying a mapping between the V2X applications and the RAT types as illustrated in FIG. 9.

In one embodiment, the PCF can select the appropriate RAT for each V2X service described above and manage information about the V2X service and associated RAT. In this case, the PCF can manage the mapping table between the V2X services and the RAT types as illustrated in FIG. 9. FIG. 12 shows a procedure in which the PCF provides mapping information between the V2X applications and the RAT types shown in FIG. 9 to the V2X terminal performing the registration procedure. Upon receiving a registration request message from the terminal 1210, the AMF 1213 may send a request for policy information related to the terminal 1210 to the PCF 1215 (step 1240). The PCF 1215 may send a request for the V2X service parameters to be applied to the terminal 1210 to the UDR 1217 (step 1250). The UDR 1217 may provide the stored V2X service parameters to the PCF 1215 (step 1260). The mapping information illustrated in FIG. 9 may be included in the V2X service parameters. If the PCF 1215 stores the V2X service parameter information, steps 1250 and 1260 of FIG. 12 may be skipped. The PCF 1215 may provide policy information to be applied to the terminal 1210 to the AMF 1213 (step 1270), where the policy information may include the V2X service parameters. The mapping information illustrated in FIG. 9 may be included in the V2X service parameters. The AMF 1213 may transmit the terminal 1210 a registration accept message including the V2X service parameter information received from the PCF 1215 (step 1280).

In one embodiment, the mapping information shown in FIG. 9 may be pre-configured in the terminal, and the terminal can use the preset mapping information.

In one embodiment, when sending a V2X message based on the mapping information shown in FIG. 9, the terminal can select the RAT type mapped to the corresponding V2X application to transmit the V2X message.

Figure 14:
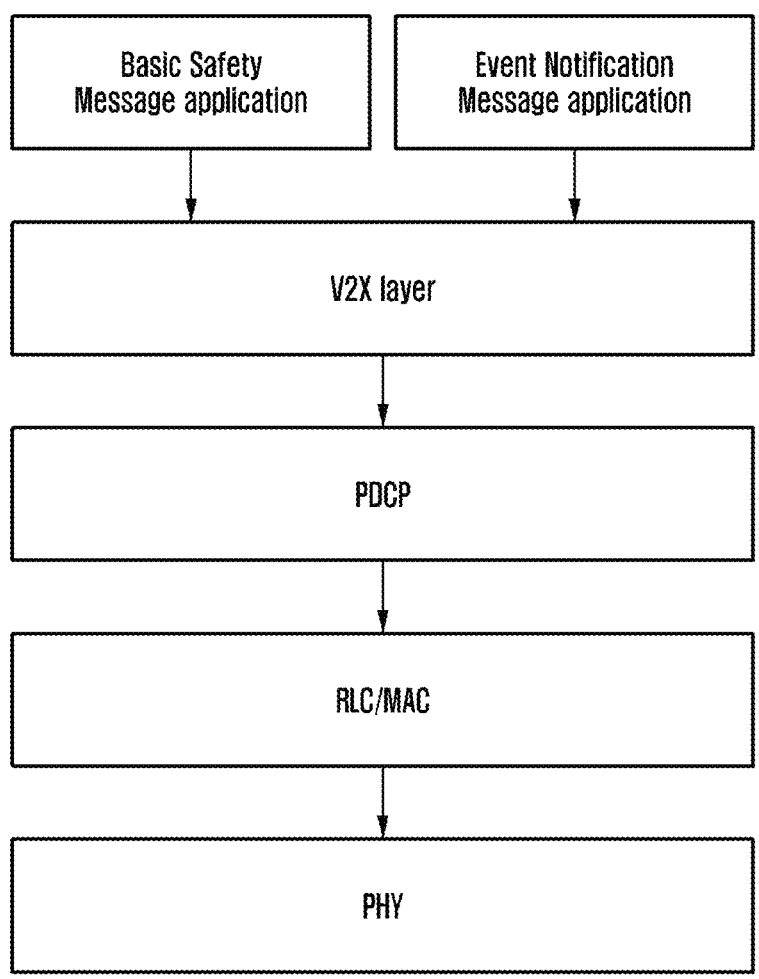
FIG. 14 illustrates a method for the terminal to select an appropriate RAT type for a specific V2X application according to an embodiment of the disclosure.

FIG. 14 illustrates operations of the terminal according to an embodiment of the disclosure. That is, FIG. 14 illustrates a method for the terminal to select an appropriate RAT type for a specific V2X application. FIG. 15 illustrates an example of a mapping between V2X services and frequency bands according to an embodiment of the disclosure.

With reference to FIG. 14, in a state where the terminal is using a basic safety message service and an event notification message service, when the terminal's basic safety message application generates a message and forwards it to the V2X layer, the V2X layer may select LTE as the RAT to transmit the basic safety message based on the mapping information shown in FIG. 9, and may forward the received basic safety message and the selected RAT information to the lower layer (PDCP). When the terminal's event notification message application generates a message and forwards it to the V2X layer, the V2X layer may select NR as the RAT to transmit the event notification message based on the mapping information shown in FIG. 9, and may forward the received event notification message and the selected RAT information to the lower layer (PDCP). The RLC, MAC and PHY layers of the terminal can transmit the corresponding message via the RAT selected by the V2X layer.

With reference to FIG. 9, it is possible to select the appropriate RAT for a V2X application based on the V2X service and the RAT type mapped thereto. It is also possible to select the appropriate RAT for a V2X application based on the V2X service and the frequency band mapped thereto. FIG. 15 illustrates a mapping between V2X services and frequency bands. For example, in the case of a basic safety message service, the V2X service ID is '0' and the terminal can select a frequency band of 1 to 100 MHz to transmit a basic safety message. In the case of an event notification message service, which may be used by a V2X terminal in the event of an emergency to notify a nearby V2X terminal of a dangerous situation, the V2X service ID is '1' and the terminal can select a frequency band of 100 to 200 MHz to transmit an event notification message. In the case of an extended sensors service, the V2X service ID is '2' and the terminal can transmit an extended sensor service message through a 5.9 GHz frequency band. The mapping between service types and frequency bands shown in FIG. 15 is an example for describing the disclosure, and does not mean that the basic safety message service is available only in the frequency band of 1 to 100 MHz. Which frequency band is mapped to which V2X service type or V2X ID can be determined by the V2X service provider providing the V2X services.

In applying the disclosure, the mapping information shown in FIG. 15 can be used in place of or in combination with the mapping information shown in FIG. 9.

Figure 16:
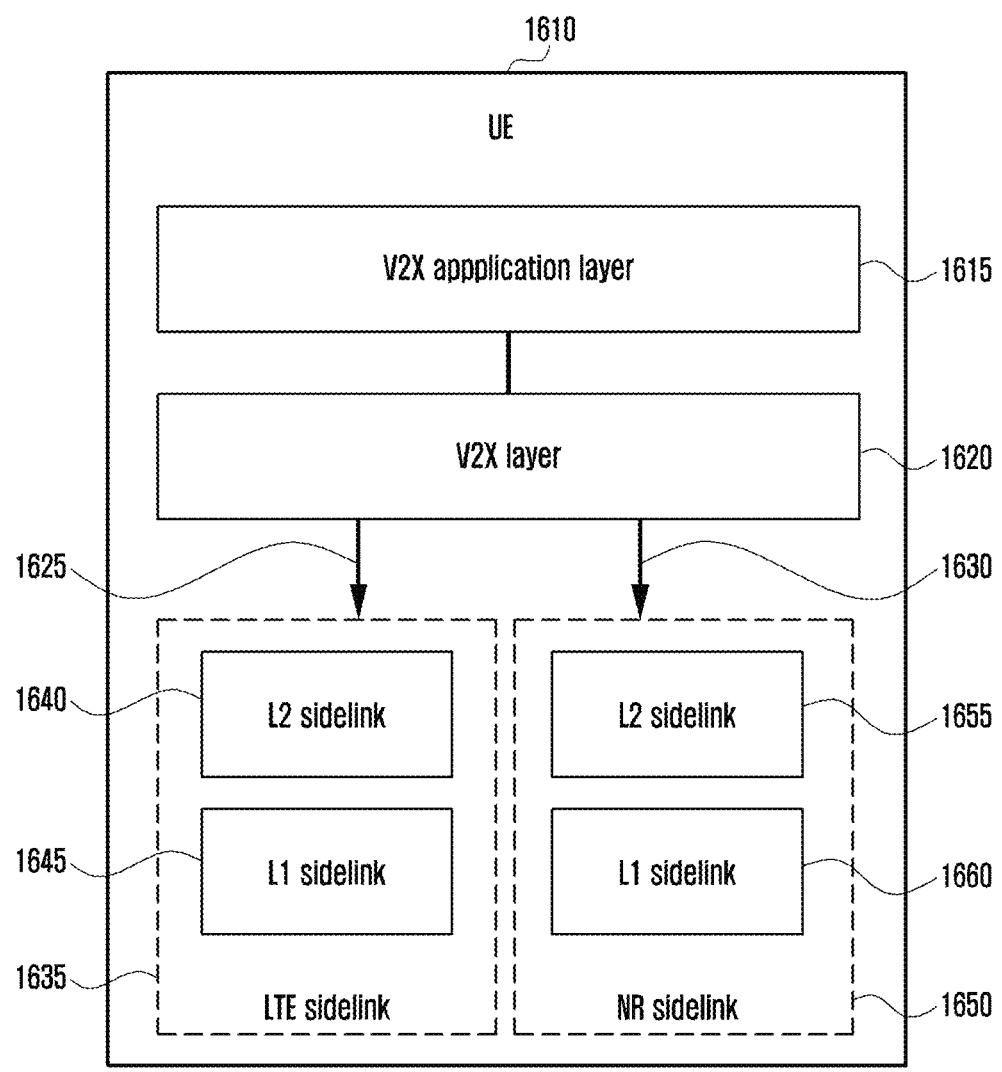
FIG. 16 illustrates a protocol stack and operation of the V2X terminal according to an embodiment of the disclosure.

FIG. 16 illustrates a protocol stack and operation of the terminal 1610 according to an embodiment of the disclosure.

With reference to FIG. 16, the terminal 1610 may include an LTE sidelink 1635 and an NR sidelink 1650. The LTE sidelink 1635 may be composed of an L1 sidelink 1645 and an L2 sidelink 1640. The L1 sidelink 1645 may be composed of a PHY layer. The L2 sidelink 1640 may be composed of the MAC layer, the RLC layer, and the PDCP layer. The NR sidelink 1650 may be composed of an L1 sidelink 1660 and an L2 sidelink 1655. The L1 sidelink 1660 may be composed of a PHY layer. The L2 sidelink 1655 may be composed of the MAC layer, the RLC layer, the PDCP layer, and the SDAP layer. The V2X application layer 1615 of the terminal may generate a V2X message and forward the V2X message and corresponding V2X service ID to the V2X layer 1620. In one embodiment, the V2X layer 1620 may store information on the mapping between V2X service IDs and RAT types shown in FIG. 9. Based on the received V2X message, the V2X service ID corresponding to the V2X message and the mapping information shown in FIG. 9, the V2X layer 1620 may determine the RAT to be used to transmit the V2X message received from the V2X application layer 1615. For example, if the V2X service ID sent from the V2X application layer 1615 to the V2X layer 1620 indicates a basic safety message (BSM), the V2X layer 1620 may determine that the message should be sent via the LTE RAT and may forward the message to the LTE L2 sidelink 1640 through the interface 1625 of the LTE modem. Upon receiving the V2X message, the LTE L2 sidelink 1640 can transmit the received V2X message through the LTE L1 sidelink 1645 and the LTE PC5 interface. As another example, if the V2X service ID sent from the V2X application layer 1615 to the V2X layer 1620 indicates an event notification message, the V2X layer 1620 may determine that the message should be sent via the NR RAT and may forward the message to the NR L2 sidelink 1655 through the interface 1630 of the NR modem. Upon receiving the V2X message, the NR L2 sidelink 1655 can transmit the received V2X message through the NR L1 sidelink 1660 and the NR PC5 interface.

In one embodiment, the V2X layer 1620 may use the UE policy stored in the terminal to determine the RAT type to be used for transmitting a V2X message received from the V2X application layer 1615. The UE policy stored in the terminal may include information specifying the communication channel (e.g., PC5 sidelink or Uu) and the RAT type (e.g., LTE or NR) available for each application ID, data flow ID, or service ID.

Figure 17:
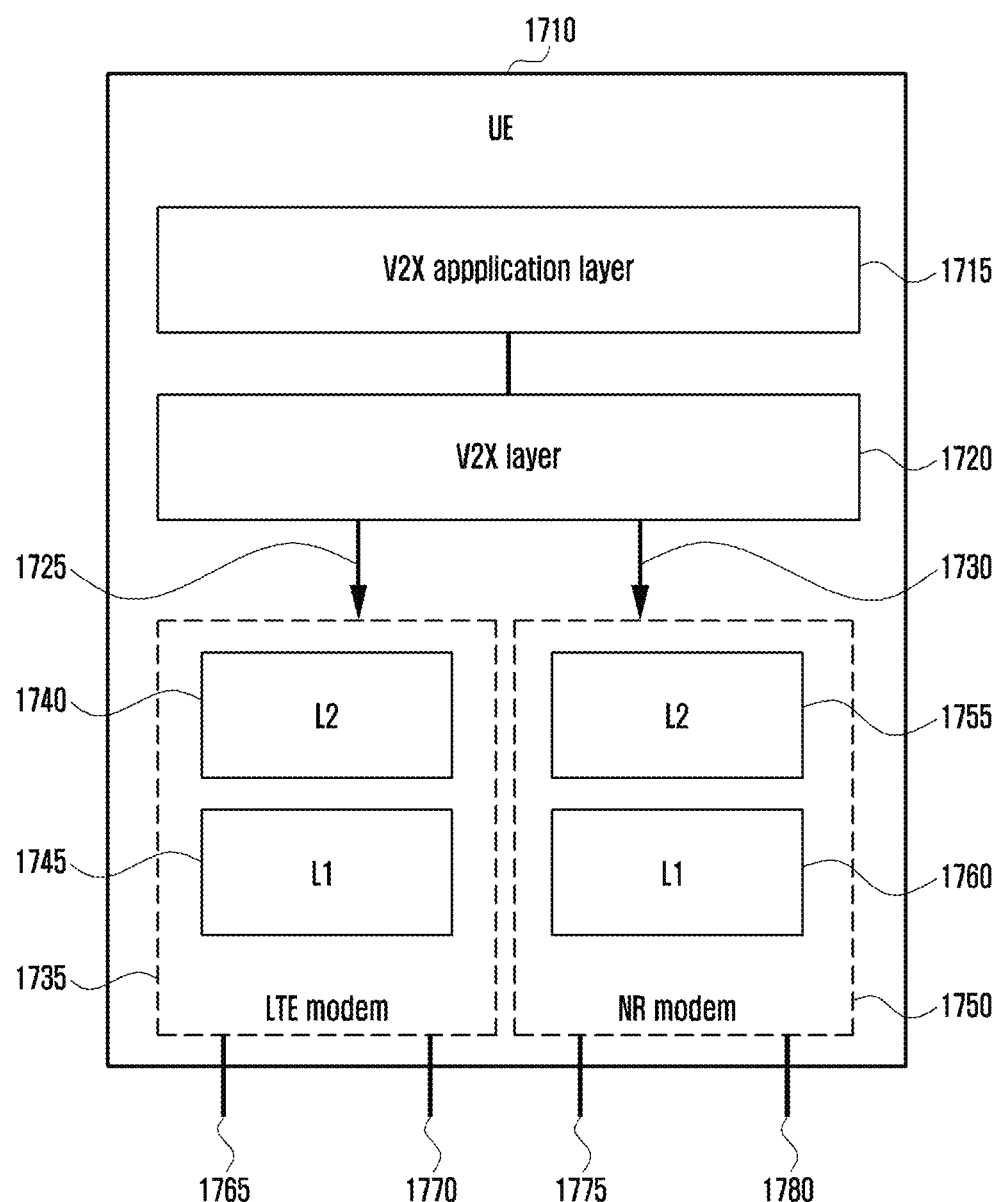
FIG. 17 illustrates a protocol stack and operation of the V2X terminal according to an embodiment of the disclosure.

FIG. 17 illustrates a protocol stack and operation of the terminal 1710 according to an embodiment of the disclosure.

With reference to FIG. 17, the terminal 1710 may include an LTE communication modem 1735 and an NR communication modem 1750. The LTE communication modem 1735 may include an L1 layer 1745 and an L2 layer 1740. The L1 layer 1745 may include the PHY layer. The L2 layer 1740 may include the MAC layer, the RLC layer, and the PDCP layer. The LTE communication modem 1735 may support an LTE Uu communication interface 1765 and an LTE PC5 communication interface 1770. The NR layer 1750 may include an L1 layer 1760 and an L2 layer 1755. The L1 layer 1760 may include the PHY layer. The L2 layer 1755 may include the MAC layer, the RLC layer, the PDCP layer, and the SDAP layer. The NR communication modem 1750 may support an NR Uu communication interface 1775 and an NR PC5 communication interface 1780. In one embodiment, the V2X application layer 1715 of the terminal 1710 may generate a V2X message and forward the V2X message and its corresponding application ID, data flow ID, or service ID to the V2X layer 1720. Based on the received V2X message, the application ID, data flow ID or service ID corresponding to the V2X message, and the UE policy information stored in the terminal, the V2X layer 1720 may determine the communication channel (e.g., PC5 sidelink or Uu) and the RAT type (e.g., LTE or NR) to be used to transmit the V2X message received from the V2X application layer 1715.

For example, the V2X layer 1720 can determine to transmit the V2X message received from the V2X application layer 1715 through the Uu link of the LTE RAT on the basis of the UE policy, and can transmit the V2X message and information indicating the communication channel to the LTE L2 1740 via the interface 1725 of the LTE modem. Upon receiving the V2X message, the LTE L2 1740 can transmit the received V2X message to the LTE L1 1745. The LTE L1 1745 may transmit the received message via the LTE Uu communication interface 1765 based on the information indicating the communication channel received from the V2X layer 1720.

Or, the V2X layer 1720 can determine to transmit the V2X message received from the V2X application layer 1715 through the PC5 link of the LTE RAT on the basis of the UE policy, and can transmit the V2X message and information indicating the communication channel to the LTE L2 1740 via the interface 1725 of the LTE modem. Upon receiving the V2X message, the LTE L2 1740 can transmit the received V2X message to the LTE L1 1745. The LTE L1 1745 may transmit the received message via the LTE PC5 communication interface 1770 based on the information indicating the communication channel received from the V2X layer 1720.

Alternatively, the V2X layer 1720 can determine to transmit the V2X message received from the V2X application layer 1715 through the Uu link of the NR RAT on the basis of the UE policy, and can transmit the V2X message and information indicating the communication channel to the NR L2 1755 via the interface 1730 of the NR modem. Upon receiving the V2X message, the NR L2 1755 can transmit the received V2X message to the NR L1 1760. The NR L1 1760 may transmit the received message via the NR Uu communication interface 1775 based on the information indicating the communication channel received from the V2X layer 1720.

Or, the V2X layer 1720 can determine to transmit the V2X message received from the V2X application layer 1715 through the PC5 link of the NR RAT on the basis of the UE policy, and can transmit the V2X message and information indicating the communication channel to the NR L2 1740 via the interface 1730 of the NR modem. Upon receiving the V2X message, the NR L2 1755 can transmit the received V2X message to the NR L1 1760. The NR L1 1760 may transmit the received message via the NR PC5 communication interface 1780 based on the information indicating the communication channel received from the V2X layer 1720.

Embodiment D

Figure 18:
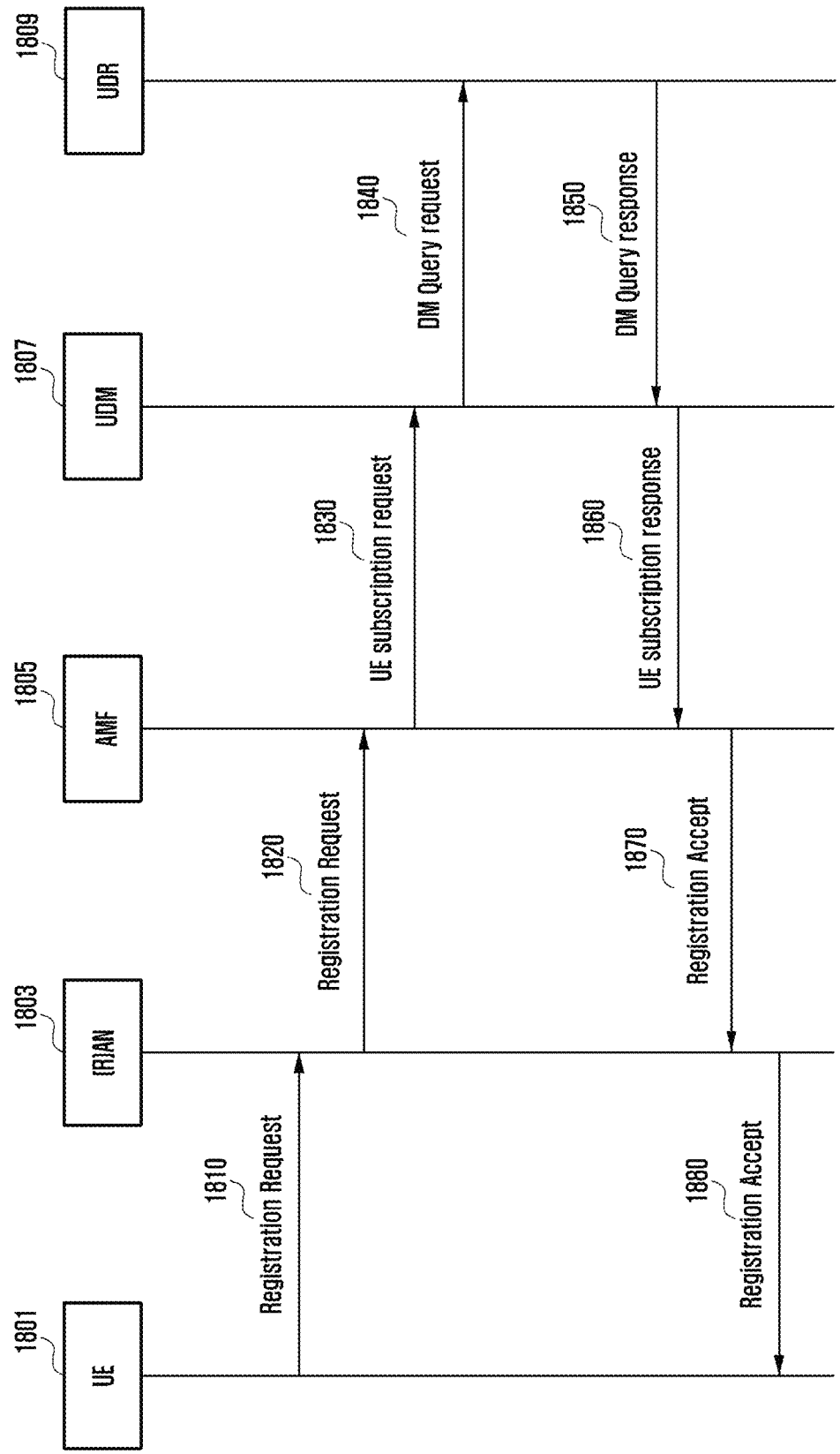
FIG. 18 illustrates a procedure for V2X service authentication according to an embodiment of the disclosure.

FIG. 18 illustrates a procedure for V2X service authentication according to an embodiment of the disclosure.

With reference to FIG. 18, the terminal 1801 may transmit a registration request message to the network at the time of an initial attach or occurrence of a mobility event (step 1810).

The terminal 1801 may include an S-NSSAI indicating a V2X network slice (S-NSSAI for eV2X) in the requested NSSAI of the registration request message. The S-NSSAI may be composed of an SST (slice service type) and an SD (slice differentiator). The terminal 1801 may include a value indicating the vehicle communication service (V2X or eV2X) in the SST field of the S-NSSAI for eV2X. In addition, the terminal 1801 may include a value indicating the mode of the terminal 1801 (vehicle UE or pedestrian UE) in the SD field of the S-NSSAI for eV2X.

The terminal 1801 may include information about the function (UE 5GMM Core Network Capability) supported by the terminal 1801 in the registration request message. When the terminal 1801 supports the function "V2X over LTE PC5", the terminal 1801 may include a V2X over LTE PC5 capability indication in the UE 5GMM Core Network Capability. If the terminal 1801 supports the function "V2X over NR PC5", the terminal 1801 may include a V2X over NR PC5 capability indication in the UE 5GMM Core Network Capability. If the terminal 1801 supports both the function "V2X over LTE PC5" and the function "V2X over NR PC5", the terminal 1801 may include both a V2X over LTE PC5 capability indication and a V2X over NR PC5 capability indication in the UE 5GMM Core Network Capability or may include one V2X capability indication indicating that the both functions are supported.

In FIG. 18, the terminal 1801 can connect to the base station ((R)AN) 1803 and register itself in the network. Upon receiving the registration request message from the terminal 1801 at step 1810, the base station 1803 may forward the received registration request message to the AMF 1805 (step 1820). Upon receiving the registration request message, the AMF 1805 can determine whether the base station 1803 to which the terminal 1801 is currently connected is an LTE base station (evolved E-UTRAN or evolved eNB) or an NR base station (NG-RAN or gNB). To determine the base station to which the terminal 1801 is connected, the AMF 1805 may use the information included in the message received at the step 1820 about the type of the access network (AN) (e.g., LTE, NR or non-3GPP) to which the terminal 1801 is connected. Alternatively, when the AMF 1805 makes a connection with the base station 1803, the AMF 1805 can identify whether the base station 1803 is an LTE base station or an NR base station. Hence, based on the base station from which the step 1820 message is received, the AMF 1805 can determine the type of the access network (AN) (e.g., LTE, NR, or non-3GPP) to which the terminal 1801 is connected.

In the UDM 1807 or the UDR 1809, the UE subscription information of the terminal 1801 and the UE capability information supported by the terminal 1801 may be stored. The UE subscription information may include information on the slice (subscribed S-NSSAIs) to which the terminal 1801 has subscribed. The UE capability information supported by the terminal 1801 may include information regarding the RAT type (e.g., LTE or NR) supported by the terminal 1801, the communication scheme (e.g., LTE PC5, NR PC5, or Uu) supported by the terminal 1801, and the service (e.g., V2X over LTE PC5, V2X over NR PC5, or V2X over Uu) supported by the terminal 1801. In addition, the UE-PC5-AMBR value usable in the PC5 communication (e.g., ProSe) of the terminal 1801 may be stored. The UE-PC5-AMBR values may be defined and stored respectively for LTE PC5 and NR PC5 for V2X communication. That is, the values for "UE-PC5-AMBR for V2X over LTE PC5" and "UE-PC5-AMBR for V2X over NR PC5" may be stored. Alternatively, one value for "UE-PC5-AMBR for V2X over PC5" may be stored for V2X communication regardless of the RAT type.

In FIG. 18, the AMF 1805 can send a request for subscription information of the terminal 1801 to the UDM 1807 (step 1830). This UE subscription request message may include the ID (SUPI) of the terminal 1801 and information on the access network (AN) (LTE, NR or non-3GPP) to which the terminal 1801 is currently connected.

In FIG. 18, upon receiving the UE subscription request message, the UDM 1807 can determine whether the subscription information corresponding to the terminal ID (SUPI) is stored in the UDM 1807. If not stored, the UDM 1807 may send a request for the stored data to the UDR 1809 (step 1840). This request message may include a terminal ID (SUPI) indicating the terminal 1801. This request message may also include an event ID. The event ID may indicate a UE capability information acquisition event of the terminal 1801 or a UE capability authentication event of the terminal 1801. This request message at step 1840 may also include an application ID indicating a V2X service. The UDR 1809 may retrieve the information corresponding to the terminal ID (SUPI) and transmit the retrieved information to the UDM 1807 as a response (step 1850). The response message at step 1850 may include the subscribed S-NSSAIs information of the terminal 1801. Further, based on the event ID or application ID included in the request message of step 1840, the UDR 1809 may determine that the request message is for V2X service authentication and may include information related to the V2X service in the response message of step 1850. The information related to the V2X service may include a UE-PC5-AMBR value usable in the PC5 communication (e.g., ProSe) of the terminal 1801. The UE-PC5-AMBR value may be UE-PC5-AMBR for V2X over LTE PC5 or UE-PC5-AMBR for V2X over NR PC5, or may only be UE-PC5-AMBR for V2X over PC5 regardless of the RAT type. Alternatively, if the request message of step 1840 does not include an event ID or application ID, the UDR 1809 may include all the stored UE capability information in the response message of step 1850 for transmission to the UDM 1807. The UE capability information may include, as the UE-PC5-AMBR, a UE-PC5-AMBR value for V2X over LTE PC5 or a UE-PC5-AMBR value for V2X over NR PC5, or a UE-PC5-AMBR value only for V2X over PC5 regardless of the RAT type.

In FIG. 18, if the subscription information corresponding to the terminal ID (SUPI) is stored in the UDM 1807 having received the UE subscription request message at step 1830, or if the response message of step 1850 is received from the UDR 1809, the UDM 1807 may send a UE subscription response message to the AMF 1805 (step 1860). The UE subscription response message may be include subscribed S-NSSAIs information of the terminal 1801. The UE subscription response message may also include a UE-PC5-AMBR value for V2X communication corresponding to the access network (AN) to which the terminal 1801 is currently connected. For example, if the terminal 1801 is currently connected to the AMF 1805 via the LTE base station (evolved E-UTRAN or evolved eNB), the UE-PC5-AMBR value for V2X over LTE PC5 may be included. If the terminal 1801 is currently connected to the AMF 1805 via the NR base station (NG-RAN or gNB), the UE-PC5-AMBR value for V2X over NR PC5 may be included. Both the UE-PC5-AMBR value for V2X over LTE PC5 and the UE-PC5-AMBR value for V2X over NR PC5 may be included regardless of the access network to which the terminal 1801 is currently connected. Or, if the UE-PC5-AMBR value stored in the UDM 1807 or the UDR 1809 is only one UE-PC5-AMBR value for V2X over PC5 for V2X communication regardless of the RAT type, the UE-PC5-AMBR value for V2X over PC5 may be included.

In FIG. 18, based on the UE subscription information received at step 1860, the AMF 1805 may process the registration request message of the terminal 1801 and determine to accept the registration request of the terminal 1801. The AMF 1805 may transmit a registration accept message indicating successful registration to the terminal 1801 via the base station ((R)AN) 1803 (steps 1870 and 1880). The registration accept message sent from the AMF 1805 to the base station 1803 at step 1870 may include the allowed NSSAI being slice information available to the terminal 1801 or a "V2X services authorized" indication. The registration accept message may also include a terminal ID (e.g., SUPI or 5G-GUTII) indicating the terminal 1801. If the allowed NSSAI included in the registration accept message includes the S-NSSAI for eV2X, or if the registration accept message includes the "V2X services authorized" indication, based on this information, the base station 1803 can recognize that the currently connected terminal 1801, which can be identified by the terminal ID, is an authorized terminal allowed to use the vehicle communication service. In addition, the registration accept message sent from the AMF 1805 to the base station 1803 at step 1870 may include a UE-PC5-AMBR value. For example, only a UE-PC5-AMBR value corresponding to the access network (AN) to which the terminal 1801 is currently connected may be included. If the terminal 1801 is currently connected to the AMF 1805 via the LTE base station (evolved E-UTRAN or evolved eNB), the UE-PC5-AMBR value for V2X over LTE PC5 may be included. If the terminal 1801 is currently connected to the AMF 1805 via the NR base station (NG-RAN or gNB), the UE-PC5-AMBR value for V2X over NR PC5 may be included. Both the UE-PC5-AMBR value for V2X over LTE PC5 and the UE-PC5-AMBR value for V2X over NR PC5 may be included regardless of the access network to which the terminal 1801 is currently connected. Or, only one UE-PC5-AMBR value for V2X over PC5 may be included for V2X communication regardless of the RAT type.

In FIG. 18, upon receiving the registration accept message from the AMF 1805, the base station 1803 may store the information included in the registration accept message. The information of the registration accept message stored by the base station 1803 may include the allowed NSSAI, the "V2X services authorized" indication, the terminal ID, the UE-PC5-AMBR value for V2X over LTE PC5, the UE-PC5-AMBR value for V2X over NR PC5, or the UE-PC5-AMBR value for V2X over PC5.

In FIG. 18, upon receiving the registration accept message at step 1880, the terminal 1801 can identify the available slice information based on the allowed NSSAI included in the registration accept message. If the allowed NSSAI includes the S-NSSAI for eV2X, the terminal 1801 can utilize the vehicle communication service. For example, if the allowed NSSAI includes the S-NSSAI for eV2X, the terminal 1801 can establish a session by including the S-NSSAI for eV2X in the PDU session establishment request message. If the terminal 1801 is connected to the AMF 1805 via an LTE base station (evolved E-UTRAN or evolved NB), the terminal may operate in "not served by NG-RAN" mode, "served by Evolved E-UTRAN" mode, or "served by E-UTRAN" mode.

For example, the terminal 1801 may operate in a network scheduled operation mode or an autonomous resources selection mode for LTE PC5 communication. That is, the terminal 1801 operating in the network scheduled operation mode can make a request for resources for the LTE PC5 communication to the base station 1803, and the base station 1803 can allocate resources to the terminal 1801 based on the UE-PC5-AMBR value for V2X over LTE PC5 received from the AMF 1805. The terminal 1801 operating in the autonomous resources selection mode can use the pre-configuration information stored in the terminal 1801 without making a request for resources for LTE PC5 communication to the base station 1803. In addition, the terminal 1801 may operate in the autonomous resources selection mode for NR PC5 communication. That is, the terminal 1801 operating in the autonomous resources selection mode can use the pre-configuration information stored in the terminal 1801 without making a request for resources for NR PC5 communication to the base station 1803. If the terminal 1801 is connected to the AMF 1805 via the NR base station (NG-RAN or gNB), the terminal 1801 may operate in "not provided by Evolved E-UTRAN" mode, "not served by E-UTRAN" mode, or "served by NG-RAN" mode. For example, the terminal 1801 may operate in the network scheduled operation mode or the autonomous resources selection mode for NR PC5 communication. That is, the terminal 1801 operating in the network scheduled operation mode can make a request for resources for the NR PC5 communication to the base station 1803, and the base station 1803 can allocate resources to the terminal 1801 based on the UE-PC5-AMBR value for V2X over NR PC5 received from the AMF 1805. The terminal 1801 operating in the autonomous resources selection mode can use the pre-configuration information stored in the terminal 1801 without making a request for resources for NR PC5 communication to the base station 1803. In addition, the terminal 1801 may operate in the autonomous resources selection mode for LTE PC5 communication. That is, the terminal 1801 operating in the autonomous resources selection mode can use the pre-configuration information stored in the terminal 1801 without making a request for resources for LTE PC5 communication to the base station 1803.

In FIG. 18, if the S-NSSAI for eV2X is not included in the allowed NSSAI of the registration accept message received at step 1880, the terminal 1801 may be unable to make a PDU session request for the V2X service. For example, the terminal 1801 cannot include an S-NSSAI for eV2X in the PDU session establishment request message to be sent. The terminal 1801 may also be unable to operate in the network scheduled operation mode for LTE PC5 or NR PC5 communication. However, the terminal 1801 may operate in the autonomous resources selection mode for LTE PC5 or NR PC5 communication.

Figure 19:
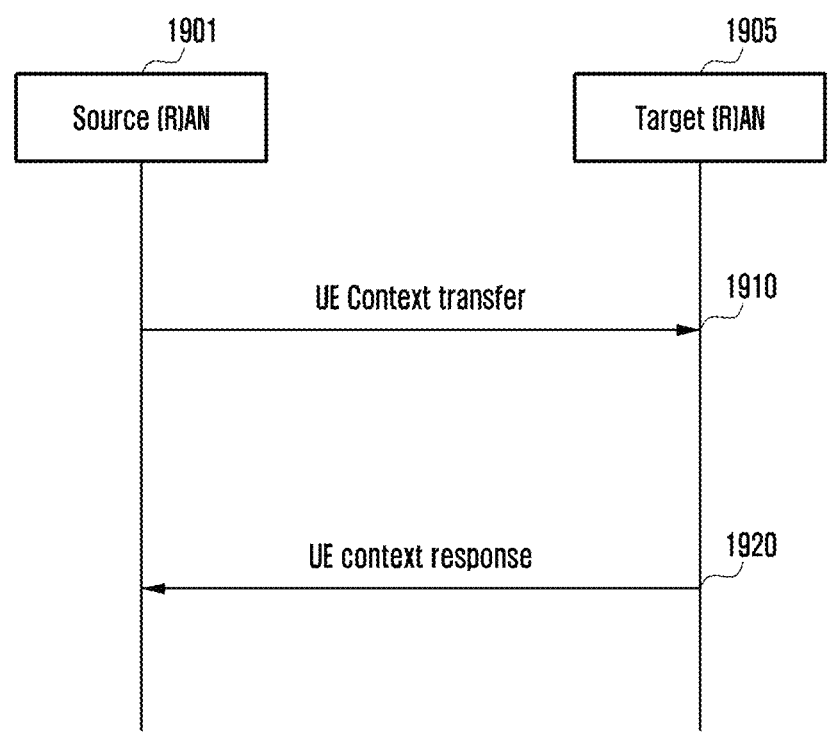
FIG. 19 illustrates information transferred from the source base station to the target base station when the terminal moves between base stations according to an embodiment of the disclosure.

FIG. 19 illustrates information transferred from the source base station to the target base station when the terminal moves between base stations according to an embodiment of the disclosure.

In FIG. 19, the source (R)AN 1901 indicates a base station to which the terminal is currently connected. The source (R)AN 1901 stores the information received from the AMF 1805 (at step 1870 of FIG. 18) as UE context. The UE context may include information on the current PC5 mode (network scheduled operation mode or autonomous resources selection mode) for each RAT type. For example, when the source (R)AN 1901 is an NR base station (NG- RAN or gNB), the PC5 mode of the terminal may be the autonomous resources selection mode for the LTE RAT and may be the network scheduled operation mode for the NR RAT, and this information may be stored in the source (R)AN 1901 as the UE context. When the terminal performs a handover from the source (R)AN 1901 to the target (R)AN 1905, the source (R)AN 1901 1901 may transfer the UE context information to the target (R)AN 1905 (step 1910). Then, the target (R)AN 1905 may transmit a UE context response message to the source (R)AN 1901 (step 1920).

Figure 20:
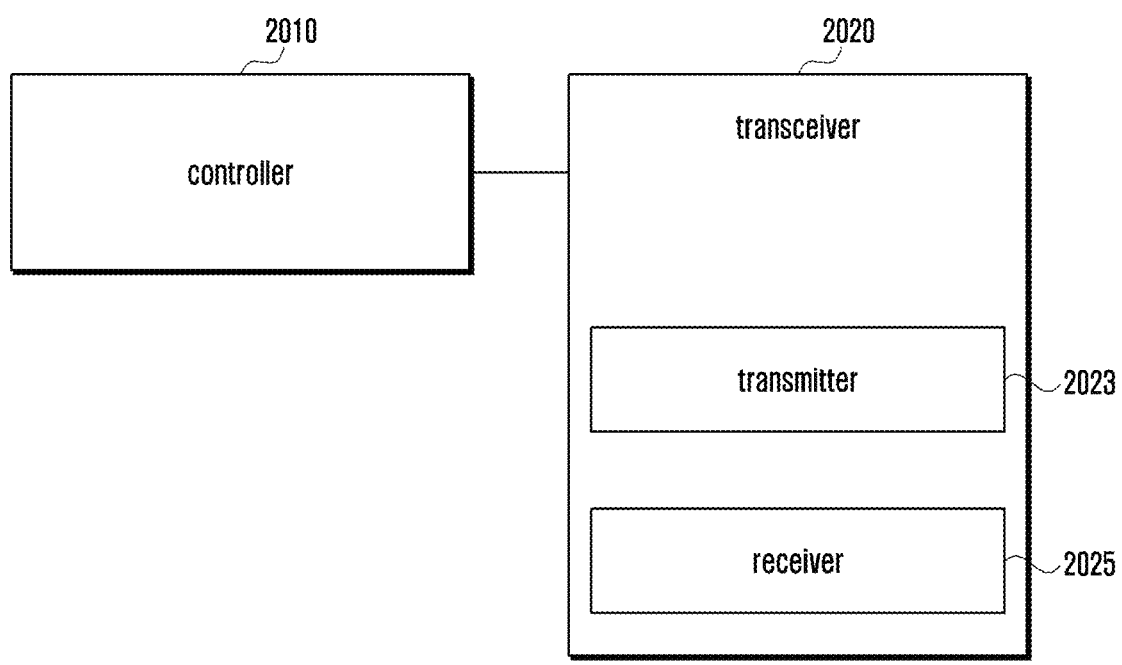
FIG. 20 illustrates a block diagram of a terminal according to the disclosure.

FIG. 20 illustrates a block diagram of a terminal according to the disclosure.

The terminal according to an embodiment of the disclosure may include a transceiver 2020, and a controller 2010 for controlling the overall operation of the terminal. The transceiver 2020 may include a transmitter 2023 and a receiver 2025.

The transceiver 2020 can send and receive signals to and from other network entities.

The controller 2010 may control the terminal to perform operations according to one of the above-described embodiments. Meanwhile, the controller 2010 and the transceiver 2020 do not necessarily have to be implemented as separate modules, but may be implemented as a single module like a single chip. The controller 2010 and the transceiver 2020 may be electrically connected. For example, the controller 2010 may be a circuit, an application-specific circuit, or at least one processor. In addition, the operations of the terminal can be realized by providing a memory storing the corresponding program codes in a specific component of the terminal.

Figure 21:
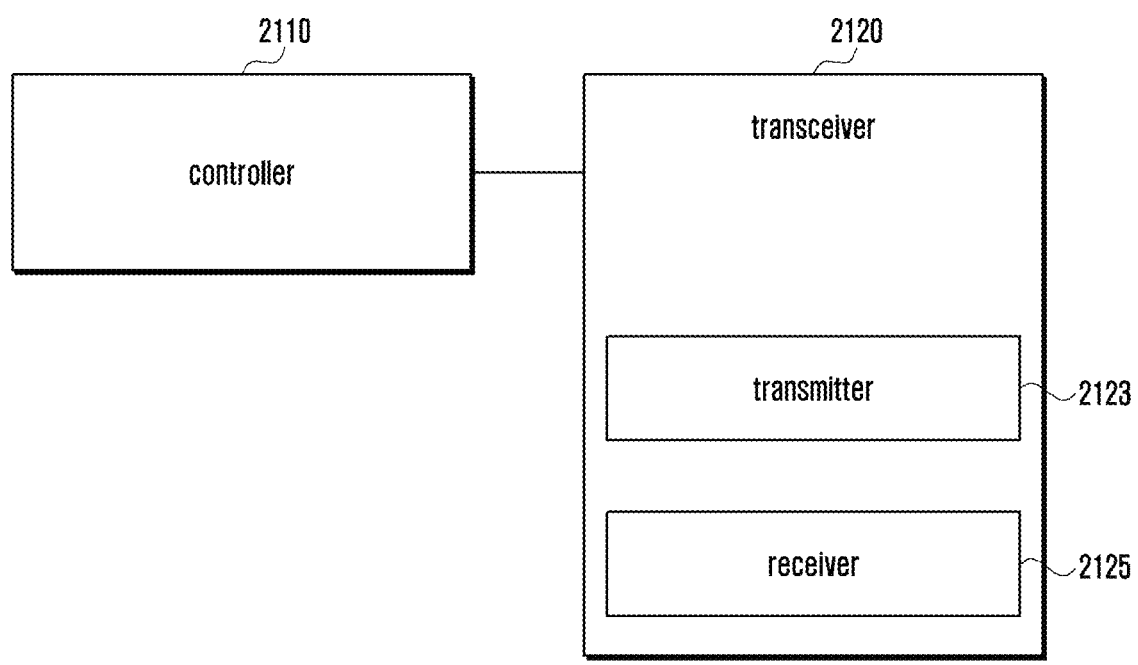
FIG. 21 illustrates a block diagram of a network entity according to the disclosure.

FIG. 21 illustrates a block diagram of a network entity according to the disclosure.

The network entity according to an embodiment of the disclosure may include a transceiver 2120, and a controller 2110 for controlling the overall operation of the network entity. The transceiver 2120 may include a transmitter 2123 and a receiver 2125.

The transceiver 2120 can send and receive signals to and from other network entities.

The controller 2110 may control the network entity to perform operations according to one of the above-described embodiments. Meanwhile, the controller 2110 and the transceiver 2120 do not necessarily have to be implemented as separate modules, but may be implemented as a single module like a single chip. The controller 2110 and the transceiver 2120 may be electrically connected. For example, the controller 2110 may be a circuit, an application-specific circuit, or at least one processor. In addition, the operations of the network entity can be realized by providing a memory storing the corresponding program codes in a specific component of the network entity.

It should be noted that structure diagrams, diagrams illustrating a control/data signal transmission method, operational procedures, and block diagrams depicted in FIGS. 1 to 21 are not intended to limit the scope of the disclosure. In other words, all the components, entities, or operations described above in FIGS. 1 to 21 should not be construed as being essential for the practice of the disclosure, and some of them may be sufficient to practice the disclosure without departing from the spirit of the disclosure.

The above-described operations of the base station or terminal can be realized by providing a memory storing the corresponding program codes in a specific component of the base station or terminal. That is, the controller of the base station or terminal can perform the above-described operations by causing a processor or CPU (central processing unit) to read and execute the program codes stored in the memory.

The various components and modules of the entity, base station or terminal described herein may be realized or operated by using hardware (e.g. complementary-metal-oxide-semiconductor based logic circuit), firmware, software, or software embedded in a machine readable medium, or any combination thereof. For example, various electrical structures and methods may be realized by using electrical circuits such as transistors, logic gates, or application specific integrated circuits.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from an access and mobility management function (AMF), mapping information between at least one vehicle to everything (V2X) service type and at least one radio access technology (RAT) type, in case that a user equipment (UE) policy update is triggered by a policy control function (PCF);
    selecting at least one RAT type corresponding to a V2X message to be transmitted, based on the mapping information; and
    transmitting the V2X message using the selected at least one RAT type.

2. The method of claim 1, wherein the transmitting the V2X message comprises:
    transmitting the V2X message using at least one of a long term evolution (LTE) RAT or a next generation (NR) RAT, in case that the selected at least one RAT type corresponding to the V2X message is the LTE RAT or the NR RAT.

3. The method of claim 1, wherein the receiving the mapping information comprises:
    transmitting, to the AMF, a request message; and
    receiving, from the AMF, a response message including the mapping information received from the PCF, as a response to the request message.

4. The method of claim 1, wherein the selecting the at least one RAT type is performed by a V2X layer of the terminal.

5. The method of claim 1, wherein the receiving the mapping information comprises:
    receiving, from the AMF, a UE configuration update message including the mapping information.

6. A method performed by an access and mobility management function (AMF) in a wireless communication system, the method comprising:
    receiving, from a policy control function (PCF), mapping information, the mapping information between at least one vehicle to everything (V2X) service type and at least one radio access technology (RAT) type, in case that a user equipment (UE) policy update is triggered by the PCF; and
    transmitting, to a terminal, the mapping information for the terminal to select at least one RAT type corresponding to a V2X message to be transmitted and to transmit the V2X message using the selected at least one RAT type.

7. The method of claim 6, wherein the receiving the mapping information comprises:

receiving, from the terminal, a request message;
transmitting, to the PCF, a policy request message; and
receiving, from the PCF, a policy response message including the mapping information,
wherein the transmitting the mapping information comprises transmitting, to the terminal, a response message including the mapping information.

8. The method of claim 6, wherein:
the receiving the mapping information comprises receiving, from the PCF, a policy update message including the mapping information, and
the transmitting the mapping information comprises transmitting, to the terminal, a UE configuration update message including the mapping information.

9. A terminal in a wireless communication system, the terminal comprising:
a transceiver; and
a controller configured to:
receive, from an access and mobility management function (AMF) via the transceiver, mapping information between at least one vehicle to everything (V2X) service type and at least one radio access technology (RAT) type, in case that a user equipment (UE) policy update is triggered by a policy control function (PCF),
select at least one RAT type corresponding to a V2X message to be transmitted, based on the mapping information, and
transmit, via the transceiver, the V2X message using the selected at least one RAT type.

10. The terminal of claim 9, wherein the controller is configured to transmit, via the transceiver, the V2X message using at least one of a long term evolution (LTE) RAT or a next generation (NR) RAT, in case that the selected at least one RAT type corresponding to the V2X message is the LTE RAT or the NR RAT.

11. The terminal of claim 9, wherein the controller is configured to:
transmit, to the AMF via the transceiver, a request message, and receive, from the AMF via the transceiver, a response message including the mapping information received from the PCF, as a response to the request message, or
receive, from the AMF via the transceiver, a UE configuration update message including the mapping information.

12. The terminal of claim 9, wherein the at least one RAT type is selected by a V2X layer of the terminal.

13. An access and mobility management function (AMF) in a wireless communication system, the AMF comprising:
a transceiver; and
a controller configured to:

receive, from a policy control function (PCF) via the transceiver, mapping information between at least one vehicle to everything (V2X) service type and at least one radio access technology (RAT) type, in case that a user equipment (UE) policy update is triggered by the PCF, and
transmit, to a terminal via the transceiver, the mapping information for the terminal to select at least one RAT type corresponding to a V2X message to be transmitted and to transmit the V2X message using the selected at least one RAT type.

14. The AMF of claim 13, wherein the controller is configured to:
receive, from the terminal via the transceiver, a request message,
transmit, to the PCF via the transceiver, a policy request message, and
receive, from the PCF via the transceiver, a policy response message including the mapping information, and
wherein the controller is further configured to transmit, to the terminal, a response message including the mapping information.

15. The AMF of claim 13, wherein the controller is configured to:
receive, from the PCF via the transceiver, a policy update message including the mapping information, and
wherein the controller is further configured to transmit, to the terminal via the transceiver, a UE configuration update message including the mapping information.

16. The method of claim 1, wherein the selecting the at least one RAT type includes comparing, to the mapping information, a V2X service identifier (ID) of a V2X service type associated with the V2X message.

17. The method of claim 16, wherein the selecting the at least one RAT type includes selecting the at least one RAT type as a long term evolution (LTE) RAT based on the V2X service ID mapping to a basic safety message (BSM).

18. The method of claim 16, wherein the selecting the at least one RAT type includes selecting the at least one RAT type as a next generation (NR) RAT based on the V2X service ID mapping to an event notification message.

19. The method of claim 16, further comprising:
generating, in a V2X application layer, the V2X message to be transmitted and the corresponding V2X service ID.

20. The method of claim 1, wherein the mapping information maps between V2X service types and frequency bands.

* * * * *